US006937356B1

(12) United States Patent
Ito et al.

(10) Patent No.: US 6,937,356 B1
(45) Date of Patent: Aug. 30, 2005

(54) DIGITAL IMAGING SYSTEM

(75) Inventors: Masanori Ito, Osaka (JP); Shigeo Sakaue, Osaka (JP); Michiharu Uematsu, Osaka (JP); Haruo Yamashita, Osaka (JP); Tsumoru Fukushima, Kyoto (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/146,835

(22) Filed: Sep. 3, 1998

(30) Foreign Application Priority Data

Sep. 3, 1997 (JP) .................................. 9-237999
Sep. 4, 1997 (JP) .................................. 9-239347

(51) Int. Cl.[7] ............................................. G06F 15/00
(52) U.S. Cl. ..................... 358/1.16; 358/487; 358/496; 358/506
(58) Field of Search ................................ 358/1.5, 1.12, 358/1.13, 1.14, 1.15, 1.16, 400, 402, 406, 358/474, 487, 496, 506; 345/656

(56) References Cited

U.S. PATENT DOCUMENTS 4,888,648 A 12/1989 Hirose et al.
5,153,729 A * 10/1992 Saito .......................... 358/474
5,274,418 A 12/1993 Kazami et al.
5,335,072 A 8/1994 Tanaka et al.
5,563,655 A * 10/1996 Lathrop ...................... 348/231
5,574,533 A 11/1996 Itoh
5,576,757 A 11/1996 Roberts et al.
5,619,738 A * 4/1997 Petruchik et al. ........... 396/311
5,633,678 A 5/1997 Parulski et al.
5,648,816 A 7/1997 Wakui (Continued)

FOREIGN PATENT DOCUMENTS

EP 398295 11/1990

(Continued)

OTHER PUBLICATIONS

Search Report corresponding to application No. EP 98 11 6689 dated Apr. 23, 1999.

(Continued)

*Primary Examiner*—Mark Wallerson
(74) *Attorney, Agent, or Firm*—RatnerPrestia

(57) ABSTRACT

When a shutter button of a digital camera is pressed, a picture signal fetched from a CCD is converted to a digital signal and compressed and written into a nonvolatile memory means like a flash memory card as a picture file which can be identified uniquely. By turning on a reproduction switch, a picture file is read out from the nonvolatile memory means, the compressed data is expanded and converted to an analog signal, and the converted picture is displayed on a liquid crystal display. By pressing a display feed key, another picture file is read out and displayed. A user can produce a control file for controlling print processing, display processing, transmission processing and the like for the picture file by selecting a particular picture file using an operation key. The nonvolatile memory means can be removed. By mounting this memory means on a printer unit, display unit or picture transmission unit, the digital camera also can be used during print, display or transmission of the picture. If multi-screen print is carried out on the printer unit, a vertical direction of each picture is unified. Further, upon reprint operation for multiple order persons, sorting work after the print is facilitated by providing with an identification means for identifying each order person.

21 Claims, 15 Drawing Sheets

U.S. PATENT DOCUMENTS

| | | | | | |
|---|---|---|---|---|---|
| 5,710,572 | A | * | 1/1998 | Nihei | 715/500.1 |
| 5,790,193 | A | * | 8/1998 | Ohmori | 348/375 |
| 5,805,215 | A | * | 9/1998 | Mizoguchi | 348/232 |
| 5,900,909 | A | * | 5/1999 | Parulski et al. | 348/231.6 |
| 5,978,016 | A | * | 11/1999 | Lourette et al. | 348/64 |
| 6,160,577 | A | * | 12/2000 | Nishimura et al. | 348/96 |
| 2001/0040684 | A1 | | 11/2001 | Takahashi | |

FOREIGN PATENT DOCUMENTS

| | | |
|---|---|---|
| EP | 0532 998 A | 3/1993 |
| EP | 0 547 633 A | 6/1993 |
| EP | 602997 | 6/1994 |
| EP | 0 738 075 | 10/1996 |
| EP | 0 738 076 | 10/1996 |
| EP | 0 825 758 | 2/1998 |
| EP | 0 881 817 | 12/1998 |
| JP | 03-222582 | 10/1991 |
| JP | 4-236588 | 8/1992 |
| JP | 5-138977 | 6/1993 |
| JP | 6-008537 | 1/1994 |
| JP | 06030373 | 2/1994 |
| JP | 6-266343 | 9/1994 |
| JP | 06350886 | 12/1994 |
| JP | 07079375 | 3/1995 |
| JP | 7-164711 | 6/1995 |
| JP | 8-018911 | 1/1996 |
| JP | 8-056323 | 2/1996 |
| JP | 08088790 | 4/1996 |
| JP | 08-223520 | 8/1996 |
| JP | 09-83853 | 3/1997 |
| JP | 9-116657 | 5/1997 |
| JP | 09130731 | 5/1997 |
| JP | 09-186851 | 7/1997 |
| JP | 9-322114 | 12/1997 |
| JP | 10-066015 | 3/1998 |
| JP | 10-304187 | 11/1998 |
| JP | 11-046331 | 2/1999 |

OTHER PUBLICATIONS

European Search Report, application No. 981166895, dated Jul. 29, 1999.

Official Japanese Action mailed on Aug. 6, 2002 for JP Application No. 9-237999.

Official Japanese Action mailed on Sep. 17, 2002 for JP Application No. 9-239347.

Official Japanese Action mailed on Jan. 21, 2003 for JP Application No. 9-239347.

European Search Report for EP 04 00 9731, dated Jun. 7, 2004.

* cited by examiner

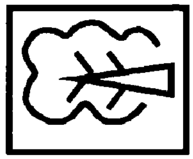
FIG. 3A
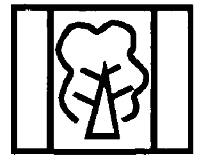
FIG. 3B
| Line No. | Content |
|---|---|
| 1 | ORDER␣M.JPG |
| 2 | A.JPG␣0 |
| 3 | B.JPG␣90 |
| 4 | C.JPG␣0 |
| 5 | D.JPG␣90 |
| 6 | ORDER␣N. JPG |
| 7 | A.JPG␣0 |
| 8 | B.JPG␣90 |
FIG. 4A
| Line No. | Content |
|---|---|
| 1 | A.JPG␣0 |
| 2 | B.JPG␣90 |
| 3 | C.JPG␣0 |
| 4 | D.JPG␣90 |
FIG. 4B
| Line No. | Content |
|---|---|
| 1 | A.JPG |
| 2 | B.JPG |
| 3 | C.JPG |
| 4 | D.JPG |
FIG. 4C

| Line No | Content |
|---|---|
| 1 | A.JPG |
| 2 | C.JPG |
| 3 | B.JPG |
| 4 | D.JPG |
| 5 | Page feed |
| 6 | A.JPG |
| 7 | B.JPG |

Content of photo Lst.txt

| Identifier | | |
|---|---|---|
| 1 | imaje12.jpg | 2 |
| 2 | imaje2q.jpg | |
| 3 | imaje53.jpg | 3 |

DIGITAL IMAGING SYSTEM

FIELD OF THE INVENTION

This invention relates to a digital camera, and to apparatuses such as a printer, picture display apparatus, picture transmission apparatus and picture viewing apparatus for exchanging picture data with a digital camera through a memory.

BACKGROUND OF THE INVENTION

In recent years, due to improvement of full-color print technology for printing an electronic video signal on paper, a high quality print comparable to a silver salt photograph has been produced. A sublimation type thermal transfer printer which is a typical example of these printers has widely prevailed as an audio-visual oriented printer for printing a video signal. An ordinary video printer has a function of capturing a video signal output from a video movie camera or the like in its frame memory so that a desired shot can be selected from a video movie tape and printed (unlike a still camera).

Further, because digital recording has been prevailing in the video movie camera, the quality of signal source for the printer has been improved.

In the background of such a digital camera technology, as a tool capable of fetching a high quality still picture into a personal computer as easily as an ordinary camera is used, an input device called a digital still camera (hereinafter referred to as DSC) has been rapidly prevailing so that the input source for the printer has been diversified.

The current DSCs have various interfaces. Most of them have an interface for fetching data into the personal computer like RS232C and additionally, have an analog video output and the like for displaying the picture on a TV monitor. In addition to a nonvolatile flash memory card as a memory for storing pictures, use of a removable memory card has increased.

Although, initially, the DSC is positioned as an input device for fetching data into the personal computer, it has been departing from the personal computer so that it is becoming an independent digital type camera. If it is intended to process an input picture to an art piece, the picture can be fetched into the personal computer, processed and printed. However, a demand for connecting the camera directly to a printer and making an easy print has been increasing. Further, in addition to the combination of the DSC and video printer, other applications of the DSC such as monitoring a picture taken with the DSC by enlarging it on a monitor screen, transmitting a picture taken with the DSC through a mobile phone and the like have been widely spreading.

FIG. 21 shows a structure of conventional DSC and video printer. When it is intended to print a picture taken with the DSC not through a personal computer, first of all, the DSC 801 is connected to a video printer 802 through a video cable 803. Then, a display feed key 804 is operated so as to output for printing a video signal of a picture to the video output of the digital camera. If that picture is output, a fetch key 805 on the video printer 802 is pressed to capture a video signal thereof. If it is intended to print two pictures on a single paper, this procedure is repeated. If capturing of video signals for the two pictures is completed, a double-screen multi-print key 806 is pressed, so that the two pictures are printed on a single paper.

FIG. 22 shows a structure of conventional DSC and home TV. The DSC 801 is connected to the home TV 807 through a video cable 808. By operating a display feed key 804 of the DSC 801, a picture to be displayed on the home TV 807 can be changed.

FIG. 23 shows a structure of conventional DSC, mobile phone and modem. The DSC 801 is connected to a modem 809 through a RSC232C interface and the modem 809 is connected to a mobile phone 810. After communication is established by operating the modem using AT command, the digital camera 801 transmits a selected picture through the mobile phone 810.

The structures of the conventional arts of FIGS. 21, 22, 23 have a problem in which the digital camera is not available for taking pictures during the aforementioned print, display, transmission or the like.

Further, in case when the double-screen multi-print is executed with the structure shown in FIG. 21, it is very troublesome to print the pictures in a condition that a picture taken with a camera held horizontally is not mixed with a picture taken with the camera held vertically.

Further, if request for reprint of pictures under the structure of FIG. 21 comes from multiple persons, it is troublesome to sort printed pictures for each order after the printing is completed.

Another object of the present invention is to unify a vertical direction of each picture when multi-screen print is executed, namely, so that a vertically long picture is not mixed with a horizontally long picture in a single paper.

Still another object of the present invention is to facilitate sorting when reprint of pictures is carried out.

When a picture taken with the DSC is input into the conventional printer by analog video signals, very fast data transmission is carried out so that, for example, under the NTSC method, a single picture can be transmitted in 1/30 seconds. However, because the interface is analog and color signal range is narrow, a high quality print in which the proper performance of the DSC is exerted cannot be achieved.

Further, because such an interface having many lines as a parallel interface is physically difficult to attach to a small DSC, usually the interface available for the DSC is limited to a serial interface such as RS232C and the like, so that it takes very long, for example, several tens seconds, to transmit a single picture.

Further, people may want a way of use like the conventional silver-salt camera, in which after a film roll (24 frames or 36 frames) is finished, by bringing that roll to a photo lab, all-shot simultaneous print is obtained. However, if a similar method is tried, because usually a printer frame memory has only a capacity for a single picture, several tens pictures stored in the camera memory are transmitted to the printer in several tens seconds per a single picture and then each picture is printed in several tens seconds. The same procedure is then repeated for each of the several tens pictures. Inconvenience may result from operating the digital camera, printer and the like.

Even if the transfer speed is increased in near future, print is desirably initiated until several tens prints are completed. Therefore, that inconvenience is not eliminated.

Further, because the DSC needs to be operated for data transmission during a print, the DSC's battery is wastefully consumed and during the print operation, the DSC cannot be used as a camera for taking a picture.

Further, because communication between the DSC and printer is desirably established until the print is finished, the DSC cannot be used as a camera until the print is finished.

Because the DSC is actuated for a long time for this purpose, the DSC's battery is consumed for purposes other than taking pictures.

Further, there is no standardized format in an interface for directly connecting the DSC to the printer in digital basis and most interfaces are specified for each particular product, so that general use of a conventional interface for the digital camera is unexpected. Even if the interface is unified in industry, because a number of picture elements output by the DSC increases every year, the number of picture elements is difficult to be standardized. Therefore, under the conventional art, a general-use printer for various users is difficult to produce.

When a structure for transferring data to a printer through a PC card as proposed in the present invention is employed, most of the above described problems are solved but the following new problems occur.

The user may not want to print all pictures recorded in the PC card corresponding to a single film roll but often wants to print only some of them. Particularly as the capacity of the PC card increases and new pictures are additionally stored subsequent to old pictures without deleting them, this tendency is intensified. The conventional printer structure may not have a convenient way for selected pictures to be printed.

Further, a number of picture elements of taken picture data varies depending on DSCs manufactured by various makers and the number of the picture elements do not always coincide with the number of picture elements printed by the printer.

Further, because in the DSCs of various manufacturers, a way for naming a picture file and a sub-directory for storing files varies depending thereon, the printer cannot be used generally among every DSC.

SUMMARY OF THE INVENTION

A digital camera comprises: a removable nonvolatile memory means; a picture-taking means for storing picture information on the nonvolatile memory means; a picture selecting means for selecting a picture; and a processing control information storage means for storing a processing method for a selected picture on the nonvolatile memory means.

According to an exemplary embodiment of the present invention, the picture selecting means is for selecting a picture to be printed, and a print control information storage means is for storing information about a picture to be printed in the nonvolatile memory means.

According to another exemplary embodiment of the present invention, a display picture selecting means is for selecting a picture to be displayed and the processing control information storage means is for storing information about a picture to be displayed in the nonvolatile memory means.

According to still another exemplary embodiment of the present invention, a transmission picture selecting means is for selecting a picture to be transmitted, and the processing control information storage means is for storing information about a picture to be transmitted in the nonvolatile memory means.

According to a further exemplary embodiment of the present invention, the processing control information storage means stores a processing instruction string for a selected picture in the nonvolatile memory means.

According to still another exemplary embodiment of the present invention, the picture selecting means is for selecting a picture corresponding to a person placing an order from stored pictures and the print control information storage means stores information about a picture corresponding to the person placing the order.

According to still another exemplary embodiment of the present invention, information is stored regarding a rotation angle of a picture in the print control information means.

According to still another exemplary embodiment of the present invention, information is stored regarding a rotation angle of a picture in the display control information storage means.

In an alternative embodiment of the present invention, the transmission control information storage means stores information regarding the rotation angle of a picture.

In an alternative embodiment of the present invention, a printer unit comprises a removable nonvolatile memory means; a multi-print means for printing multiple pieces of picture information to be printed from picture information stored on the nonvolatile memory means on a single paper; a print control information obtaining means for obtaining print control information relating to at least processing of information to be printed and a rotation angle of a picture stored on the nonvolatile memory means; a print order adjusting means for adjusting a print order so as to include picture information of the same rotation angle in the same group and so that plural pictures to be printed on a single paper belong to the same group; and a print control means for specifying a print order to the multi-print means.

In an alternative embodiment of the present invention, a printer unit comprises: a removable nonvolatile memory means; a print means for printing picture information from picture information stored in the nonvolatile memory means; a print control information obtaining means for obtaining information about a picture to be printed and a print order person stored on the nonvolatile memory means; a print order adjusting means for determining a print order according to a print order specified by the print control information; a frame specifying means for instructing the print control means to input a different color, a different shape or a frame line having a different width in a print result in case when the order person asks to print a different picture; and a print control means for specifying a print order and a frame color to the print means.

In an alternative embodiment of the present invention, the print control information obtaining means obtains print control information about a picture corresponding to the person, the printer unit further comprising: an order person list forming means for instructing the picture symbolizing the order person to be printed using a frame line specified by the frame specifying means.

In an alternative embodiment of the present invention, the printer unit further comprises: a marking specifying means for instructing the print control means to enter a different mark into a print result in case when the order person asks to print a different picture instead of the frame specifying means, the print control means specifying a print order and mark to the print means.

In an alternative embodiment of the present invention, the print control information obtaining means obtains print control information about a picture symbolizing the order person and the printer unit further comprises: an order person list forming means for instructing to print a picture symbolizing the order person using a mark specified by the marking specifying means.

In an alternative embodiment of the present invention, the print control information obtaining means obtains print control information about a picture to be printed and a rotation angle of the picture and the print order adjusting means regards pictures having the same rotation angle as the same group and adjusts and determines a print order so that picture information of a different group is not printed mixedly on a single paper.

In an alternative embodiment of the present invention, a picture display unit comprises: a display means for displaying picture information; a removable nonvolatile memory means; a display control information obtaining means for obtaining display control information relating to a picture to be displayed from the removable nonvolatile means; and a display control means for specifying a display order for the display means.

In an alternative embodiment of the present invention, a picture display unit comprises: a transmission means for transmitting picture information; a removable nonvolatile memory means; a transmission control information obtaining means for obtaining transmission control information relating to a picture to be transmitted from the removable nonvolatile memory means; and a transmission control means for specifying a transmission order for the transmission means.

In an alternative embodiment of the present invention, a picture viewing unit comprises: a removable nonvolatile memory means; a picture selecting means for selecting a picture to be subjected to at least one of print, display, transmission and a special treatment on the nonvolatile memory means; and a control information storage means for storing information of at least one of print, display, transmission and a special treatment of the selected picture on the nonvolatile memory means.

In an alternative embodiment of the present invention, a picture print system includes the aforementioned digital camera and the aforementioned printer unit.

In an alternative embodiment of the present invention, a picture display system includes the aforementioned digital camera and the aforementioned picture display unit.

In an alternative embodiment of the present invention, a picture transmission system includes the digital camera and the picture transmission unit.

In an alternative embodiment of the present invention, a picture viewing system includes the aforementioned digital camera and the aforementioned picture-viewing unit.

In an alternative embodiment of the present invention, the digital camera, printer unit, picture display unit, picture transmission unit and picture viewing unit are combined with each other, by carrying the removable nonvolatile memory means therebetween, the digital camera can be freely used for taking pictures or processing of taken pictures even during a print, display, transmission or viewing of the pictures.

In an alternative embodiment of the present invention, when multi-screen print is executed, the pictures are printed so that a vertical direction of each picture is unified and the printed pictures are sorted depending on each person placing orders.

In an alternative embodiment of the present invention, when reprint is carried out, sorting of the pictures after the print is facilitated by indicating a particular marking for each person placing orders.

In an alternative embodiment of the present invention, a printer unit comprises: a connector for connecting a nonvolatile memory means storing pictures; a card control means for controlling the nonvolatile memory means through the connector; a file control means for reading a file in the nonvolatile memory means; a picture conversion means for converting the file read by the file control means to a predetermined picture data type; a picture processing means for converting the picture data obtained by the conversion to a printable data type by carrying out picture processing; a print control means for inputting the data obtained by the picture processing so as to generate a head control signal; and a print control means for determining one or more pictures to be printed in a predetermined procedure and instructing at least the file control means.

In an alternative embodiment of the present invention, the nonvolatile memory means has a print control file stored at a predetermined position, and the print control means reads the print control file stored at a predetermined position of the nonvolatile memory means by using the file control means and determines a file name to be printed according to a content set in the print control file in case when the print control file exists.

In an alternative embodiment of the present invention, the printer unit further comprises: a frame memory having a function for displaying a picture on a monitor; and a file retrieval means for retrieving a file having a predetermined format stored in the nonvolatile memory means, wherein the print control means retrieves a file having a predetermined format of the nonvolatile memory means in a predetermined order from a predetermined position of the nonvolatile memory means using the file retrieval means, reads the retrieved file using the file control means, converts the file to picture data by the picture conversion means, stores the converted data in the frame memory and displays on a monitor, the printer unit printing a picture selected by user from the displayed pictures by the picture processing means and the print control means.

In an alternative embodiment of the present invention, the printer unit further comprises: a frame memory having a function for displaying a picture on a monitor; a file retrieval means for retrieving a picture file having a predetermined format stored in the nonvolatile memory means, the picture conversion means having a function for converting picture data to reduced picture data, the print control means retrieving a picture file having a predetermined format in the nonvolatile memory means in a predetermined order from a predetermined position of the nonvolatile memory means using the file retrieval means, reads the retrieved picture file using the file control means, stores the picture data reduced by the picture conversion means in the frame memory repeatedly and displays multiple reduced pictures in the form of a list on a monitor, the printer unit printing one or more pictures selected by user from the multiple pictures.

In an alternative embodiment of the present invention, the file retrieval means retrieves all files having a predetermined format in the nonvolatile memory means having any hierarchical structure by starting retrieval from a predetermined file path in the nonvolatile memory means so as to obtain a retrieval result by retrieving a next file in the directory or in case when there is a smaller directory in the directory, retrieving in the small directory in the same procedure.

In an alternative embodiment of the present invention, the picture conversion means comprises: a means for analyzing a header portion of a picture file read from the nonvolatile memory means to extract at least numbers of horizontal and vertical picture elements and a predetermined parameter necessary for expansion of a compressed picture; a means for enlarging the compressed picture data to bit image picture using the parameter; and a magnification means for enlarging and reducing the expanded bit image picture to a size appropriate for storage in the frame memory.

With such a structure, from pictures taken with a DSC or the like for recording pictures in a memory card of a nonvolatile memory means, the memory card is removed like a film roll from the DSC, and inserted into a connector provided in a slot of the printer. Then, a picture stored in a predetermined file format within the memory card of the nonvolatile memory means is accessed by driving each signal line of the memory card by the card control means according to a predetermined sequence. As a result, the picture is read out as a file by the card control means and further the file format is decoded by the picture conversion means and read out as a picture. The read picture is converted to a printable data format by the picture processing means and converted to a head driving signal by the print control means. Then, a desired picture is drawn by the thermal head.

The print control means selects a file and executes printing according to pictures and their order specified by user using a user interface function possessed by the printer or pictures and their order specified by the print control file sent from the DSC and stored at a predetermined position of the card.

Therefore, if the memory card is transferred to the printer after taking pictures, the DSC is capable of taking next pictures and further, the DSC's battery is not consumed for printing.

If printing of multiple pictures is instructed, the printer automatically prints without any human operation. Further, it is possible to construct a print system capable of printing from various types of the DSCs if a memory card having a standard format is used.

In an alternative embodiment of the present invention, the aforementioned printer unit further comprises: a video signal processing means for processing an analog video signal so as to carry out writing into the frame memory and display of the processed data, the printer unit capturing the analog video signal processed by the video signal processing means in the frame memory and writing the picture captured in the frame memory into the nonvolatile memory means using the file control means.

With such a structure, the analog video signal from a video movie camera or the like can be input and written into a frame memory by the picture processing means. Then, by writing such a captured picture into the nonvolatile memory means by the file control means, the analog signal picture can be displayed and printed like the digital signal picture taken with a digital camera.

BRIEF DESCRIPTION OF THE DRAWINGS

FIG. 3 is an explanatory view for explaining an operation of a rotation key which is display selecting means in the first exemplary embodiment of the present invention;

FIG. 4A is a diagram showing a content of print control information file 8 "PRINT" according to the first exemplary embodiment of the present invention;

FIG. 4B is a diagram showing a content of display control information file 8*b* according to the third exemplary embodiment of the present invention;

FIG. 4C is a diagram showing a content of communication control information file 8*c* according to the fourth exemplary embodiment of the present invention;

DESCRIPTION OF THE PREFERRED EMBODIMENTS

First Exemplary Embodiment

Figure 1:
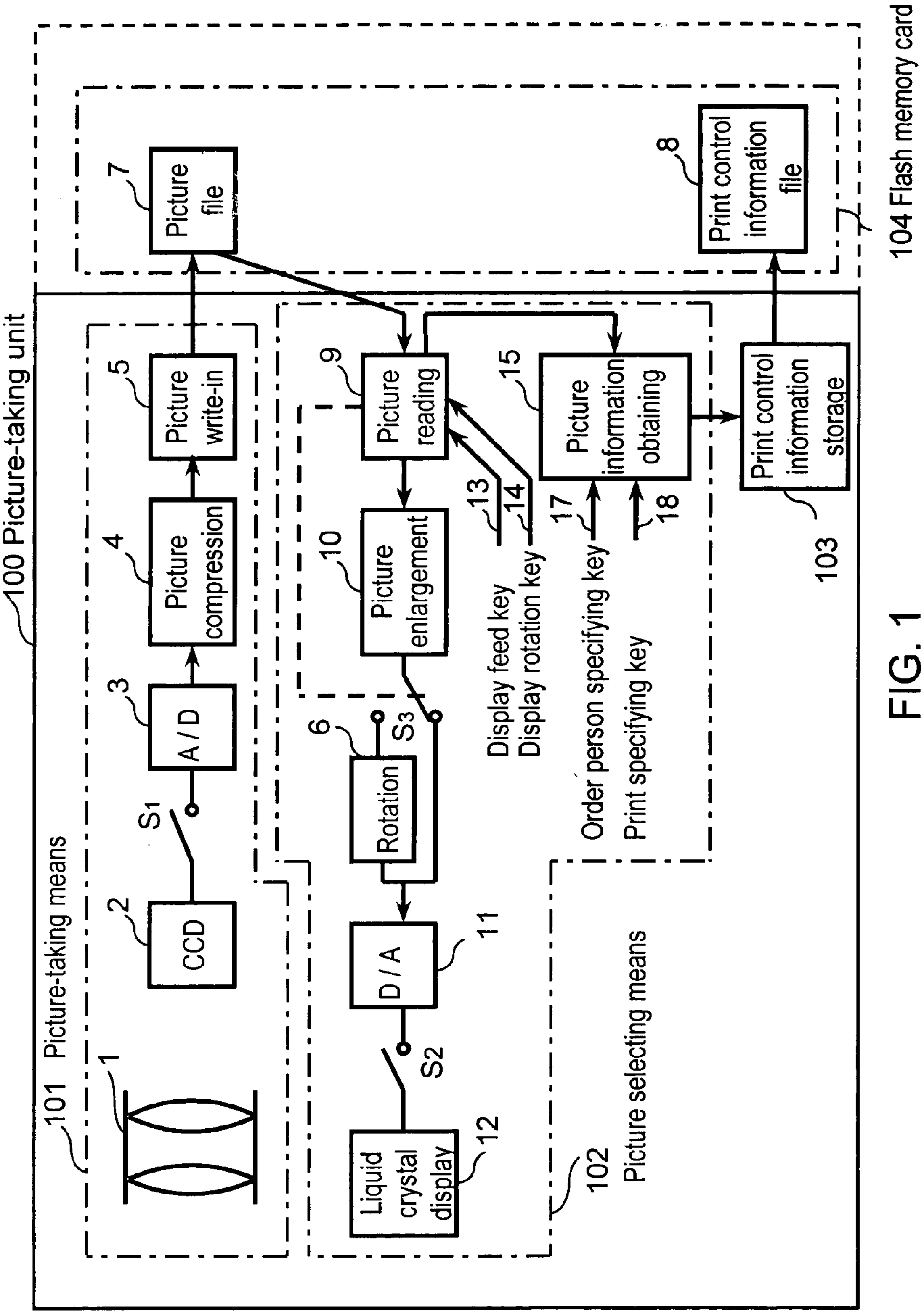
FIG. 1 is a block diagram of a digital camera constituting a digital camera print system according to a first exemplary embodiment of the present invention.

A digital camera print system according to a first embodiment of the present invention is described with reference to FIGS. 1–7. Each of the components is constituted of hardware or firmware, or both.

A digital still camera 100, which is a picture-taking unit constituting a digital camera print system according to a first embodiment of the present invention, is described with reference to a block diagram of FIG. 1. The picture-taking unit 100 comprises picture-taking means 101, picture selecting means 102, print control information storage means 103 and a flash memory card 104.

In the picture-taking means 101 of FIG. 1, an objective lens 1 focuses an optical image of an object on a charge coupled device (hereinafter referred to as CCD) 2. A signal output of the CCD 2 by this optical image is fetched through a switch (shutter button) S1 which is a shutter and input to an A/D converter 3, so that the analog signal is converted to a digital signal. The digital output of the A/D converter 3 is compressed by a picture compression means 4. The picture write means 5 writes the compressed digital signal in a flash memory card 104 in a file form making it possible to specify a certain file with its file name uniquely.

In a picture selecting means 102 of FIG. 1, a picture reading means 9 reads a picture file from a picture file 7 of the flash memory card 104 by specifying a file name. The read picture file is enlarged by a picture enlargement means 10 and then converted from a digital signal to an analog signal by a D/A converter 11, and displayed on a liquid crystal display 12 which is a display means, through a reproduction switch S2. The displayed picture is updated with a new picture by pressing a display feed key 13 and as required, a rotation switch S3 is turned by a display rotation key 14 to rotate a display angle by a rotating means 6. A picture information obtaining means 15 obtains information about a picture displayed on the liquid crystal display 12 from a picture read means 9 by pressing a person ordering specifying key 17 and print specifying key 18.

A print control information storage means 103 generates print control information and produces a print control information file 8 in the flash memory card 104. The flash memory card 104 is removable from the digital camera and is a nonvolatile memory. This flash memory card 104 forms a removable nonvolatile storage means. The picture file 7 and print control information file 8 are memorized for example in the form of DOS format.

Figure 2:
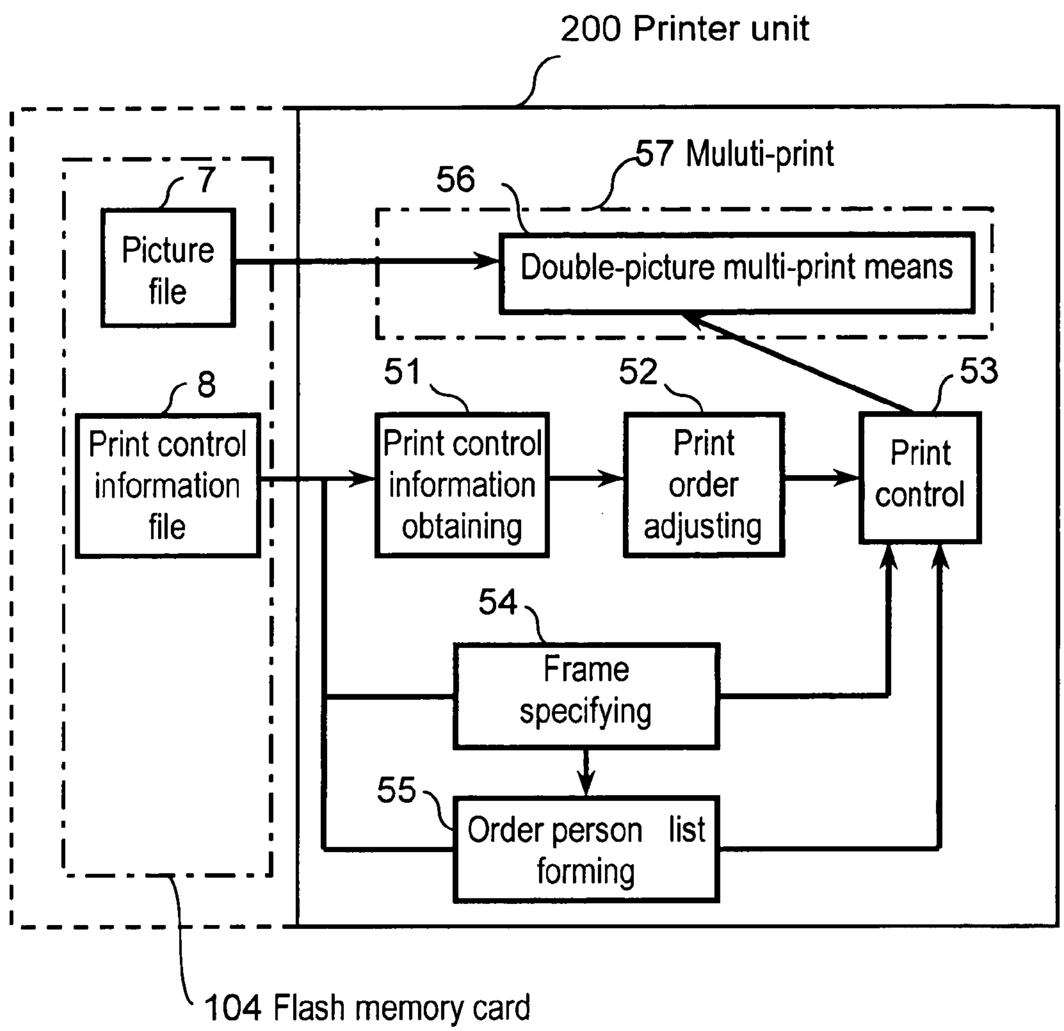
FIG. 2 is a block diagram of a printer unit constituting a digital camera print system according to the first exemplary embodiment of the present invention.

FIG. 2 is block diagram of a printer unit 200 according to the embodiment of the present invention. The print control information obtaining means 51 obtains print control information file 8 on the flash memory card 104. A print order adjusting means 52 classifies pictures to be printed according to the rotation angles of the pictures so as to adjust the print order so that any picture of a different rotation angle is not mixed up. The print control means 53 controls a double-picture multi-print means 56 to carry out a print in a specified print order with a specified frame color. The print control means 53 prints a person ordering list according to an instruction of an order person list forming means 55 after all the pictures are printed. A frame specifying means 54 instructs the print control means to change a color of the frame depending on the order person. The order person list forming means 55 instructs to print picture information indicating an order person with a frame line of the same color as used by the frame specifying means. A multi-print unit 57 has the double-picture multi-print means 56 and is capable of printing two picture files fetched from the flash memory card 104 according to an instruction of the print control means 53 on a single paper.

An operation of the printer unit is described with reference to FIGS. 1 and 2. Now assume that the shutter button S1 is pressed. A picture signal fetched from the CCD 2 of the picture-taking means 101 is converted to a digital signal by the A/D converter 3, compressed by the picture compression means 4 and written into the flash memory card 104 as a picture file 7 which can be identified uniquely in the memory card by the image write means 5. Now assume that six files, “A.JPG”, “B.JPB”, “C.JPG”, “D.JPG”, “M.JPG”, “N.JPG” taken by six shots are stored in the flash memory card 104. Assume that of these files, “M.JPG” and “N.JPG” are taken by users Mr. M and Mr. N, respectively.

The user can see a taken picture on the liquid crystal display 12 by turning on the reproduction switch S2. That is, the picture reading means 9 reads out a file and the picture enlargement means 10 enlarges the compressed data and then the D/A converter 11 converts to analog signals, so that the converted data is displayed on the liquid crystal display 12. If the user presses the display feed key 13, the picture reading means 9 reads another file different from a currently displayed picture and begins to display it.

When a picture taken by setting a camera in a condition in which it is turned at an angle 90° to the left side is displayed as shown in FIG. 3A, if the user presses the display rotation key 14, the picture reading means 9 calls the displayed picture again and turns the rotation switch S3 to the side of the rotation means 6. Then, the enlarged picture is displayed on the liquid crystal display 12 in a condition that it is turned at an angle 90° to the right side by the display rotation key 14 as shown in FIG. 3B. Next, if the display feed key 13 is pressed, the display rotation switch S3 is turned back to an opposite side.

When Mr. M tries to register a picture to be printed, he should display a picture by the display feed key 13 and press the person ordering specifying key 17. Then, the picture information obtaining means 15 obtains a file name of a displayed picture from the picture reading means 9. The print control information storage means 103 adds a character string “ORDER” in front of the file name M.JPG and memorizes it in the flash memory card 104 as a first line of the print control information file 8 “PRINT”.

Next assume that Mr. M displays “A.JPG” as a picture which he wants to print by the display feed key 13. At this time, if the print specifying key 18 is pressed, the picture information obtaining means 15 obtains a file name of a displayed picture and a status of the display rotation key 14 from the picture reading means 9. Unless the display rotation key 14 is used, the print control information storage means 103 memorizes a character string “A.JPG 0” in the flash memory card 104 as a second line of the print control information file “PRINT”. The last “0” indicates a status of the display rotation key 14. If the display rotation key 14 is kept pressed, “90” is set. After that, “B.JPG” is turned by pressing the display rotation key 14 and the print specifying key 18 is pressed so as to display “C.JPG”. After that, the print specifying key 18 is pressed to display “D.JPG” and the display rotation key 14 is pressed to turn the “D.JPG”. Then, the print specifying key 18 is pressed and consequently, up to the fifth line of FIG. 4 is produced.

Next, Mr. N selects a picture to be printed and a print control information file from the sixth line to the eighth line is produced.

Figures 6, 7A, 7B, 7C, 7D:
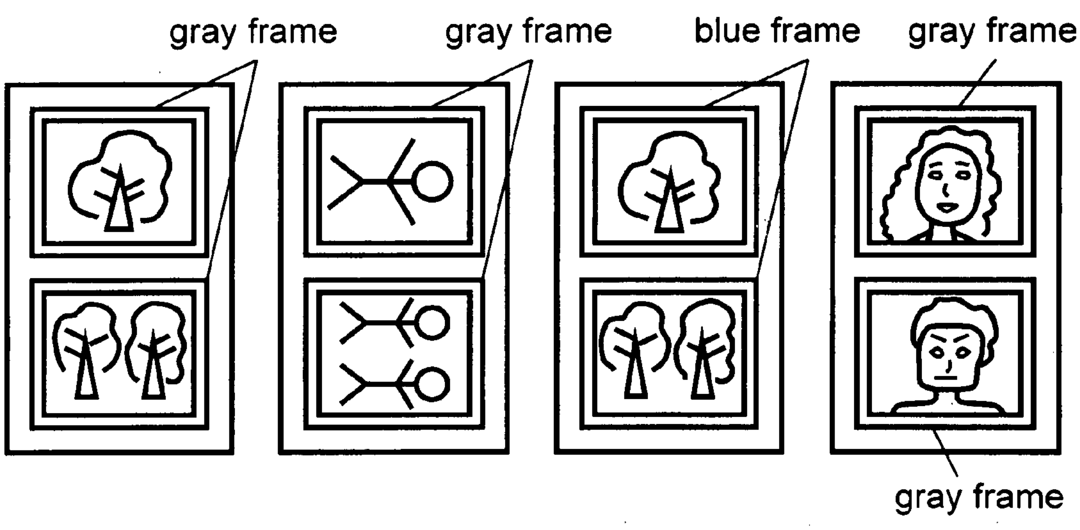
FIG. 6 is a diagram showing a content of indication to a print control means by the print order adjusting means according to the first exemplary embodiment of the present invention.
FIGS. 7A–D are diagrams showing an output result of a printer unit according to the first exemplary embodiment of the present invention.

The user mounts the flash memory card 104 removed from the picture-taking unit 100 on the printer unit 200 to print a selected picture. Then, the print control information obtaining means 51 finds out a "PRINT" file and notifies the content of that file to the print order adjusting means 52, frame specifying means 54 and order person (or person ordering) list forming means 55. The print order adjusting means 52 classifies pictures having the same rotation angle to groups and adjusts the print order not to mix different group pictures on a single paper as accurately as possible. As a result, a print order of FIG. 6 is determined.

Figure 5:
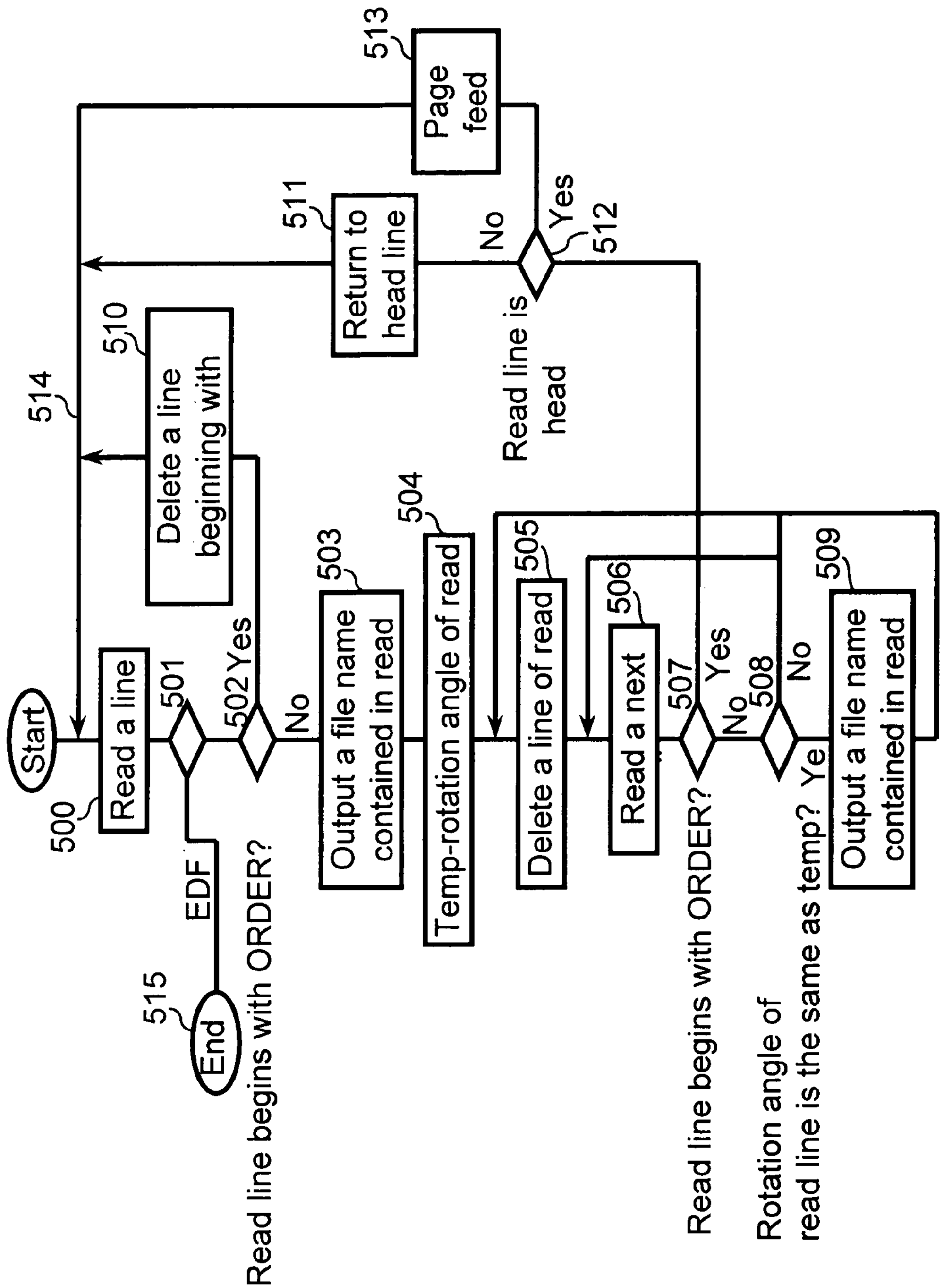
FIG. 5 is a flow chart showing an operation of print order adjusting means according to the first exemplary embodiment of the present invention.

At this time, the print order adjusting means 52 carries out the following procedure as shown in a flow chart of FIG. 5. First, an entire print control information file of FIG. 4 is copied to its own memory and at step 500, a single line of the head of the file copied at step 500 is read. If EOF (end of file) is not detected at step 501, at step 502, in case the beginning line begins with ORDER, a line beginning with ORDER in the memory is deleted at step 510 and a next line is read at step 500. Because the next line does not begin with ORDER, a file name A.JPG contained in this line is output at step 503. At step 504, a rotation angle contained in this line is memorized in the memory temp as 0°. Next, at step 505, a line in the memory corresponding to this line is deleted and at step 506, a next line (corresponding to a third line of FIG. 4) on the memory is read. Because at step 507, this line does not begin with ORDER and the rotation angle of a line read at step 508 is 90°, which is different from a value of temp, the processing returns to step 506, in which a next line (corresponding to a fourth line of FIG. 4) in the memory is read.

Because the rotation angle of this line coincides with 0° which is a value of temp, the processing goes to step 509, in which a file name C.JPG contained in this line is output. Then, the processing returns to step 505, in which a line corresponding to this line in the memory is deleted. The fifth line of FIG. 4 is processed as described above.

If a sixth line is read from the memory, because this line begins with ORDER, the processing goes from step 507 to step 512. Because the read line is not a beginning line of the memory, the reading line returns to the beginning line of the memory and then the beginning line is read at step 500.

In the same procedure, file names B.JPG, D.JPG are output and corresponding lines in the memory are deleted. After a next line on the memory is read at step 506, a line (corresponding to a sixth line of FIG. 4) beginning with ORDER is read and therefore, the processing goes from step 507 to step 512. Here, because the read line is a beginning line in the memory, page feed is carried out at step 513. After that, A.JPG, B.JPG are output in the same processing. If a file in the memory is empty and EOF (end of file) is detected at step 501, the output is terminated at step 515.

If the frame specifying means 54 receives a content of the print control information file "PRINT", a color of each printing frame is specified for each order person. Because the order person changes at the fifth line, the frame specifying means 54 instructs the print control means to change the frame color from gray to blue. Further it notifies the order person list forming means 55 that a gray frame has been used for a first order person and a blue frame has been used for a next order person.

The order person list forming means 55 draws out a picture file of a line beginning with "ORDER" of the print control information file 8 "PRINT" and instructs the print control means 53 to print a picture file 7 using a frame color received from the frame specifying means 54.

The print control means 53 carries out an instruction received from the print order adjusting means 52 first of all.

As a result, the double-picture multi-print means 56 prints three pictures as shown in FIGS. 7A–7C. Next, a single picture is printed according to an instruction from the order person list forming means 55 as shown in FIG. 7D.

Although it is previously stated that the rotation angle can be selected only 0° or 90°, it is permissible to select an arbitrary angle. Pictures of 90° and 270° can be printed on the same paper if either of them is turned at 180° and printed.

Although according to this embodiment, the order person is identified by changing the color of the print frame, it is permissible to change the width or shape of the print frame line. Further it is permissible to use a particular shape mark (e.g., a red square or blue square) as an identification method. Further, it is permissible to print a particular mark on a back of the paper.

Although according to this embodiment, the rotation angle can be confirmed by user operation, the rotation angle may be automatically obtained by a posture detecting means.

Although according to this embodiment, information about the order person is used in order to facilitate sorting work, it is permissible to calculate a reprint price and print or display it.

Although according to this embodiment, a picture symbolizing (i.e. corresponding to) an order person is selected, it is permissible to input a character string for identifying the order person so that it is included in the print control information. Further, that character string may be printed.

Although according to this embodiment, an example of two screen printing has been indicated, this embodiment is possible for not only the two screen printing but also three or four screen printing. Depending on the way of control, single screen printing made on an entire screen is also possible.

Although according to this embodiment, the flash memory card is taken as a removable nonvolatile memory means, the flash memory card may be hard disk card, floppy disk, opto-magnetic disk, optical disk, magnetic tape, memory card backed up by power supply or any other suitable medium.

Although according to this embodiment, the rotation angle and the like are used as the print control information, it is permissible to contain a quantity of pictures to be printed, trimming frame position and the like.

According to this embodiment, after inserting the memory card 104 into the printer unit 200, it is possible to automatically print images without necessity of the digital camera. Also, if another memory card is inserted into the digital camera even during the printing, it is still possible to take a picture by the digital camera.

In addition, even when images with different rotation angles are printed in various orders, it is easy to undergo the printing so that the longitudinal directions of the images are made the same.

Also, in performing the reprint printing, it is possible to readily realize the sorting processing after printing frames or marks depending on the order person as well as an order person list.

Second Exemplary Embodiment

A picture processing system utilizing the digital camera according to a second embodiment of the present invention is described with reference to FIGS. 8A–8C.

For this embodiment, a case in which a printer unit 200*a* carries out double zoom print without any treatment by specifying double zoom processing in a picture-taking unit 100*a* upon print operation, is described.

Figure 8A:
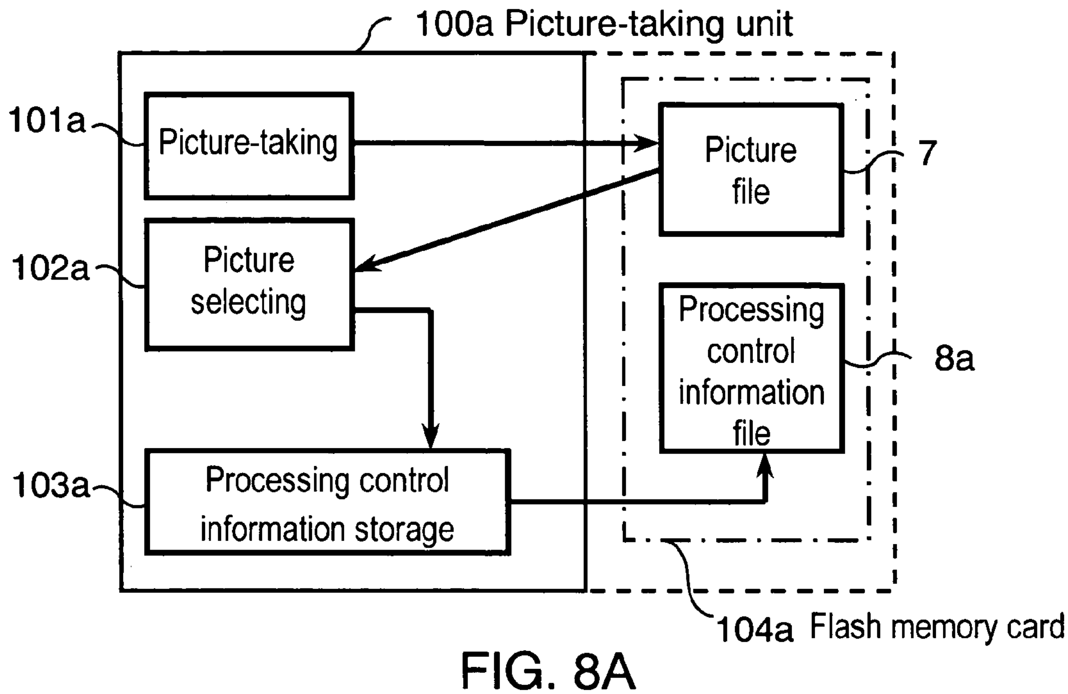
FIG. 8A is a block diagram of a digital camera constituting a picture processing system according to a second exemplary embodiment of the present invention.
Figure 8B:
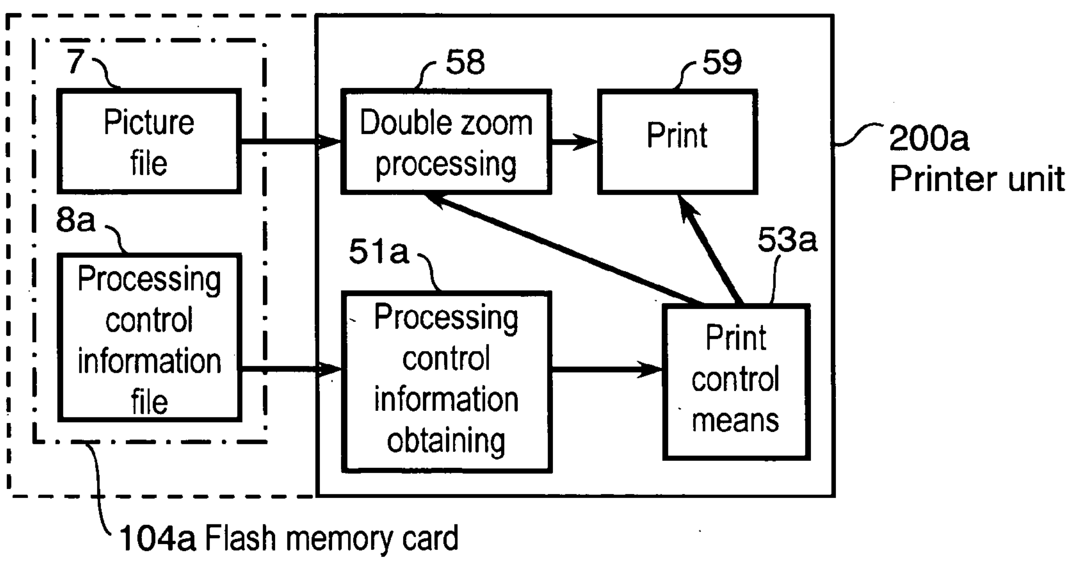
FIG. 8B is a block diagram of a printer unit constituting a picture processing system according to the second exemplary embodiment of the present invention.
Figure 8C:
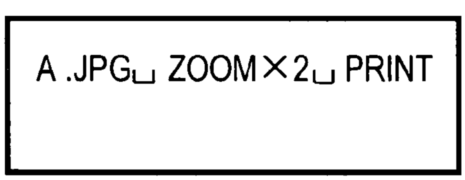
FIG. 8C shows an example of a command character string as a processing instruction string, which is a content of a processing control file of a removable nonvolatile memory means in the picture processing system according to the second exemplary embodiment of the present invention.

Referring to FIG. 8A, a digital still camera which is a picture-taking unit comprises a picture-taking means 101*a*, a picture selecting means 102*a*, a processing control information storage means 103*a* and a flash memory card 104*a*. Because the picture-taking unit 100*a* has the same structure as the picture-taking unit 100 of the first embodiment in FIG. 1, a detailed description is omitted. Like the first embodiment, if a user selects that he wants to print in double enlargement from picture data stored in the picture file 7 by using a picture selecting means 102*a* of the picture-taking unit 100*a*, the processing control information storage means 103*a* produces a processing control information file 8*a* containing a picture file name "A.JPG", a command character string "ZOOM×2", a command character string "PRINT" and the like in a flash memory card 104*a* as shown in FIG. 8C.

This flash memory card 104*a* is removed from the picture-taking unit 100*a* and mounted on a printer unit 200*a*. As shown in FIG. 8*b*, the printer unit 200*a* comprises a processing control information obtaining means 51*a*, a print control means 53*a*, a print means 59, a double-zoom processing means 58, and a flash memory card 104*a*. Because the printer unit 200*a* has the same structure as the printer unit 200 of the first embodiment of FIG. 2, a detailed description is omitted. The printer unit 200*a* zooms a picture to double size by a double zoom processing means 58 according to a processing control information file 8*a* and then prints the picture by the print means 59. Although in this embodiment, only a case in which the double zoom processing is selected by the double zoom processing means 58 by the user has been described, it is permissible to so construct that multiple processings can be selected by the user.

Third Exemplary Embodiment

A display system utilizing a digital camera according to a third embodiment of the present invention is described with reference to FIGS. 9 and 10.

Figure 9:
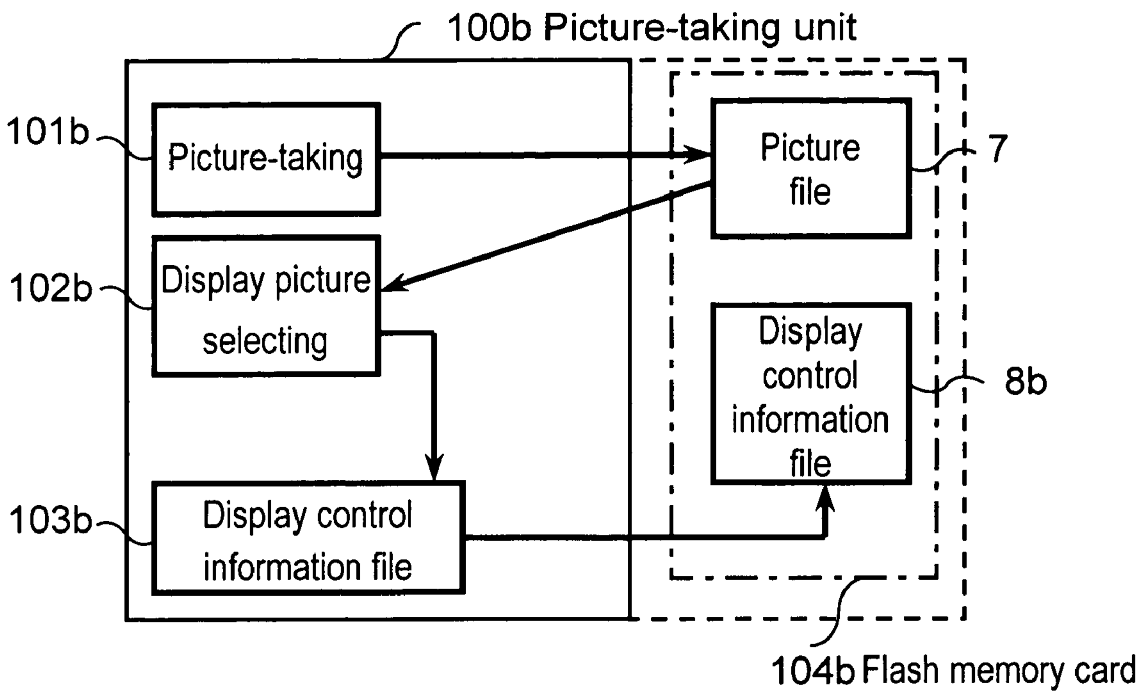
FIG. 9 is a block diagram of a digital camera constituting a display system according to a third exemplary embodiment of the present invention.

Referring to FIG. 9, a digital still camera 100*b* which is a picture-taking unit comprises a picture-taking means 101*b*, a display picture selecting means 102*b*, a display control information storage means 103*b* and a flash memory card 104*b*. Because the picture-taking unit 100*b* is of the same structure as the picture-taking unit 100 of the first exemplary embodiment in FIG. 1, a detailed description is omitted.

According to this embodiment, like the print system of FIG. 8, in a picture-taking unit 100*b* of this display system, a display control information storage means 103*b* produces a file name of a picture selected by a display picture selecting means 102*b* of the digital camera by user on a flash memory card 104*b* as a display control information file 8*b* (FIG. 4B shows an example of the file 8*b*).

Figure 10:
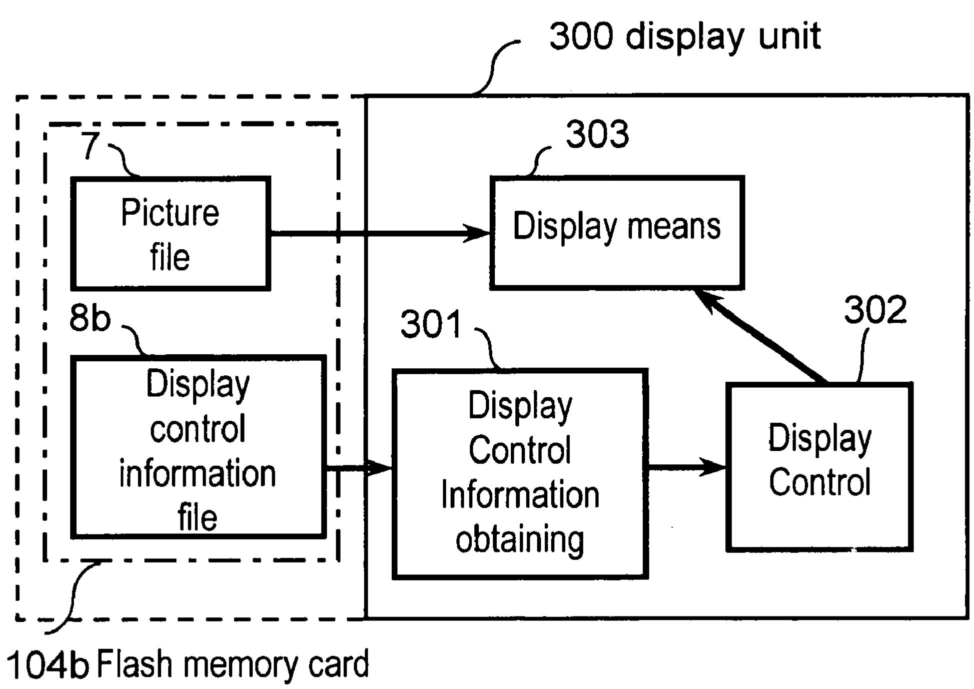
FIG. 10 is a block diagram showing a display unit constituting a display system according to the third exemplary embodiment of the present invention.

As shown in FIG. 10, a display unit 300 comprises a display control information obtaining means 301, a display control means 302, a display means 303 and a flash memory card 104*b*. Because the display unit 300 has the same structure as the printer unit of the first exemplary embodiment in FIG. 2, a description thereof in detail is omitted. The display control means 302 of the display unit 300 obtains a file name of a picture to be displayed from the flash memory card 104*b* through the display control information obtaining means 301 and successively displays pictures on the display means 303.

At this time, "DISPLAY" or the like is determined as a display control file name. Consequently, by inserting a memory card into the display unit 300, pictures can be automatically displayed successively even without a digital camera.

Fourth Exemplary Embodiment

A communication system using the digital camera according to a fourth embodiment of the present invention is described with reference to FIGS. 11 and 12.

Figure 11:
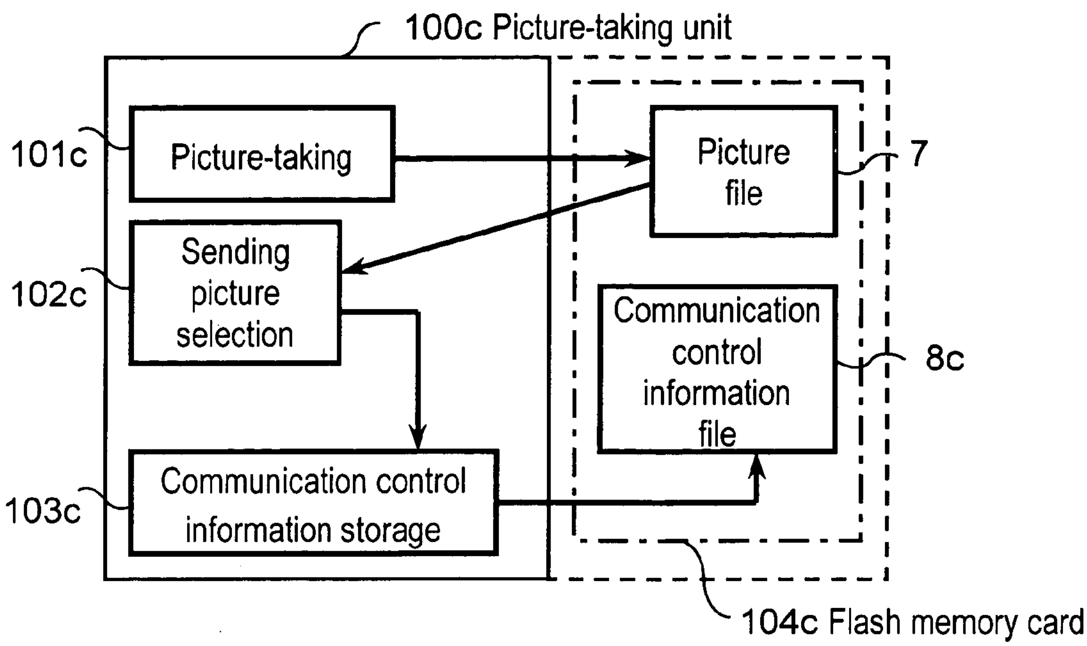
FIG. 11 is a block diagram showing a digital camera constituting a transmission system according to a fourth exemplary embodiment of the present invention.

Referring to FIG. 11, a digital still camera 100*c* which is a picture-taking unit comprises a picture-taking means 10*c*, a sending picture selection means 102*c*, a communication control information storage means 103*c* and a flash memory card 104*c*. Because the picture-taking unit 100*c* has the same structure as the picture-taking unit 100 of the first exemplary embodiment, a description thereof in detail is omitted.

According to this embodiment, a communication control information storage means 103*c* stores a picture file 7 taken by a user with a picture-taking means 101*c* in a flash memory card 104*c* and a file name of a picture selected by a sending picture selection means 102*c* is produced on the flash memory card 104*c* as a communication control information file 8*c* (FIG. 4C shows an example of the file 8*c*).

Figure 12:
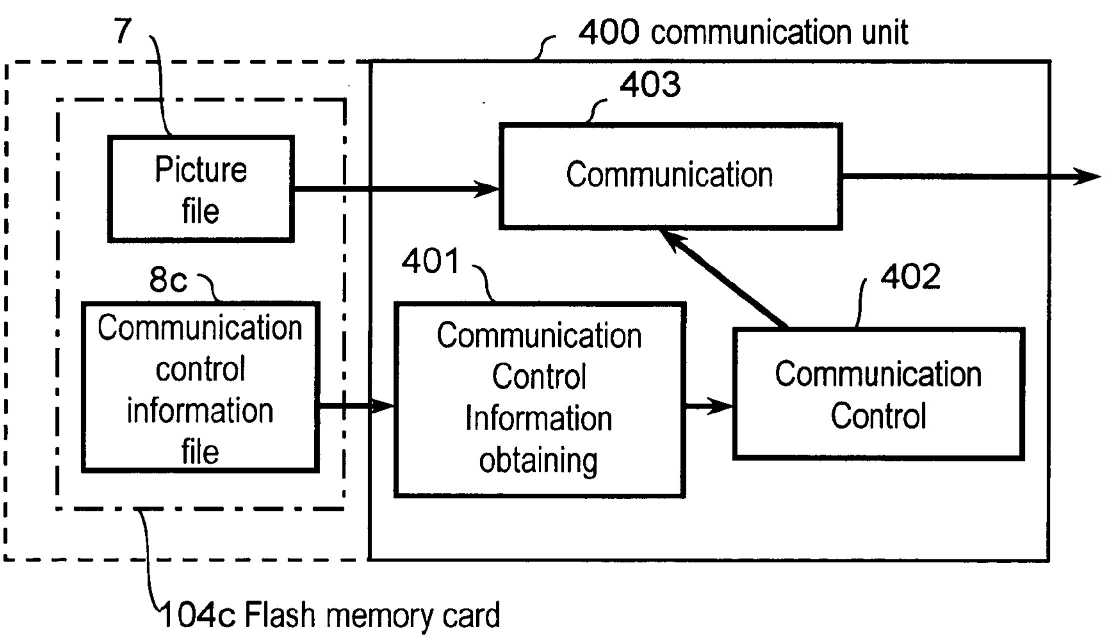
FIG. 12 is a block diagram showing a transmission unit constituting a transmission system according to a fourth exemplary embodiment of the present invention.

As shown in FIG. 12, a communication unit 400 comprises a communication control information obtaining means 401, a communication control means 402, a communication means 403 and the flash memory card 104*c*. Because the communication unit 400 has the same structure as the printer unit 200 of the first exemplary embodiment in FIG. 2, a description thereof in detail is omitted. The communication control means 402 obtains a file name of a picture to be transmitted from a communication control information file 8*c* of the flash memory card 104*c* through the communication control information obtaining means 401 and instructs the communication means 403 to send pictures successively.

At this time, "SEND" or the like is determined as a display control file name.

As a result, by inserting the memory card into a communication unit such as a mobile phone and modem, pictures can be automatically transmitted even without a digital camera.

A picture viewing unit can be realized which has no picture-taking means and comprises a removable flash memory card, a picture selection means for selecting a picture to be subjected to a particular processing such as printing, display or transmission, and a control information storage means for storing information about a particular processing of a selected picture, such as printing, display or transmission into the flash memory card.

Although in the above-described embodiment, the picture information has been explained as a still picture information, the picture information may be not only a still picture but also an animation picture. If the animation picture is printed, one or a plurality of frames are selected from that animation picture file and printed. Although in the above embodiments, the print control information file has been described as being used only for printing, this may be applicable for other various particular processing such as display and transmission.

Although in the above respective embodiments and related description, functions such as picture-taking, print, picture processing, display, transmission and viewing have been described as if each of them was handled independently, a single unit may include more than one of these functions or unit having each function may be combined.

Fifth Exemplary Embodiment

Figure 13:
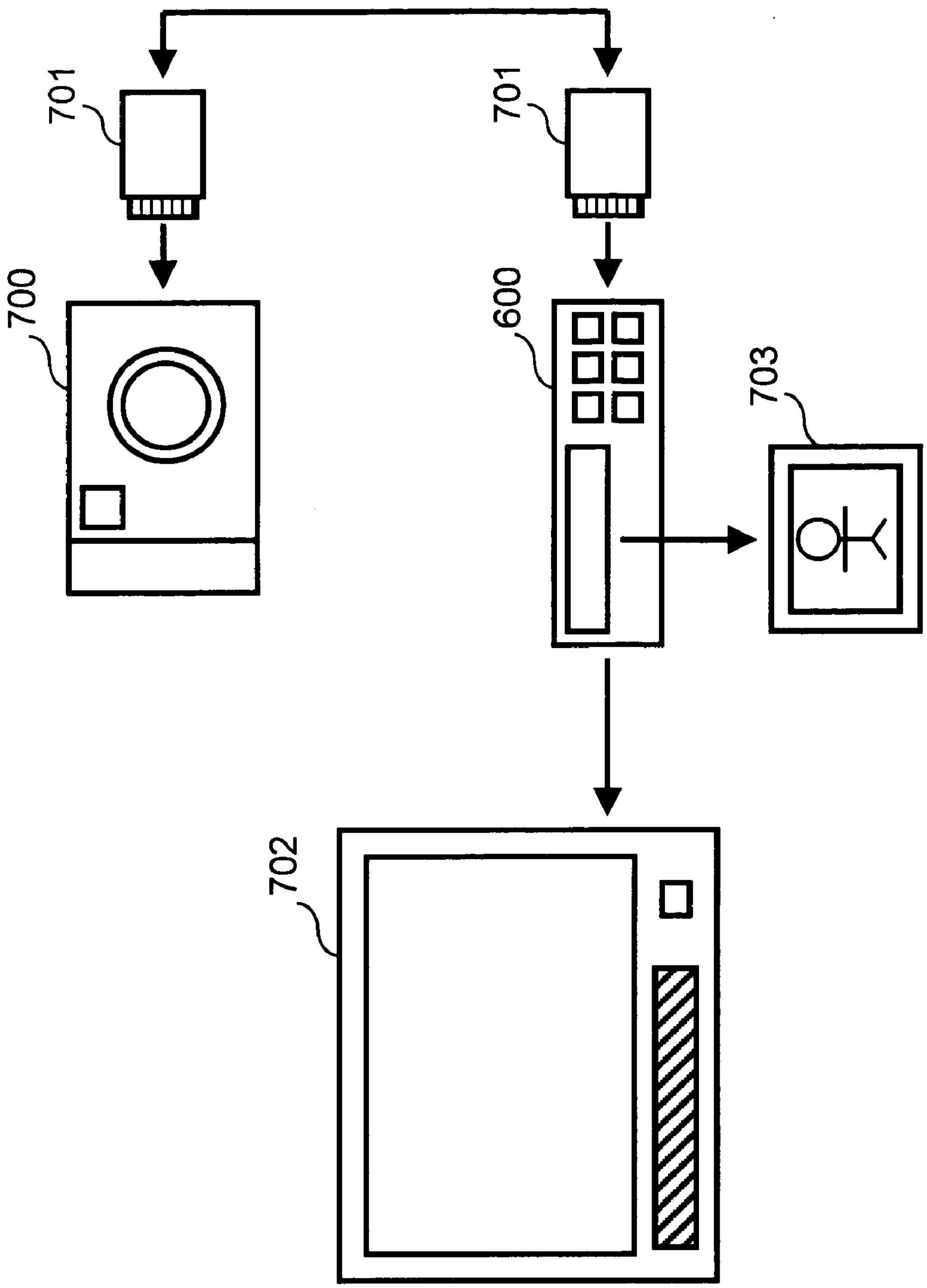
FIG. 13 is an explanatory illustration of a print system according to a fifth exemplary embodiment of the present invention.

A print system according to a fifth exemplary embodiment of the present invention is described with reference to FIG. 13. A memory card 701 like a flash memory card, which is a nonvolatile memory means freely removable from a digital still camera (DSC) 700 memorizes information of pictures taken with the DSC 700. The removable memory card 701 containing information of pictures taken with the DSC 700 is inserted into a printer 600. The printer 600 fetches picture information from the memory card 701 and prints a picture as a print sample 703 while displaying it on a connected monitor 702.

In this system, the DSC 700 corresponds to a camera in an ordinary camera system and the memory card 701 corresponds to a film. If several tens of pictures are taken in the memory card 701, even if there is still a capacity for further storage, the user removes the memory card 701 from the DSC 700 and mounts it on the printer 600. The printer 600 has a function for displaying on the monitor 702 and by a function for displaying a picture stored in the memory card 701 (hereinafter referred to as browsing function), one or multiple pictures are selected and indicated by such an indicating function as a cursor key provided on the printer 600 (corresponding to a procedure of marking a film frame upon asking a photo lab for reprint).

If the selection is finished and print is started, the printer 600 continuously prints selected pictures. For the user, this system corresponds to the roles of camera and photo lab of the conventional art basis.

Sixth Exemplary Embodiment

The print system according to a sixth embodiment of the present invention is described with reference to FIGS. 14–17. In the printer unit of this embodiment, PCMCIA2.1/JEIDA4.2 based PC card which is standardized as a memory card is used and a file system in the card is MS-DOS compatible. As a picture file system, JPEG format is utilized which is actually a standard format in almost all DSCs because it has a high compressibility thereby reducing a file capacity and can be read in most personal computers.

The printer uses, for example, a sublimation type thermal transfer engine and its recording picture size is, for example, A6 size. The DSC of each company using the memory card utilizes full-size PC card (ATA card), stamp size CF (compact flash) card, SM (smart media) card or the like. The CF card and SM card can make access substantially as a PC card by mounting it on an adapter card for converting to the PC card size. Therefore, the DSC printer has the widest versatility by being provided with a PC card slot.

Figure 14:
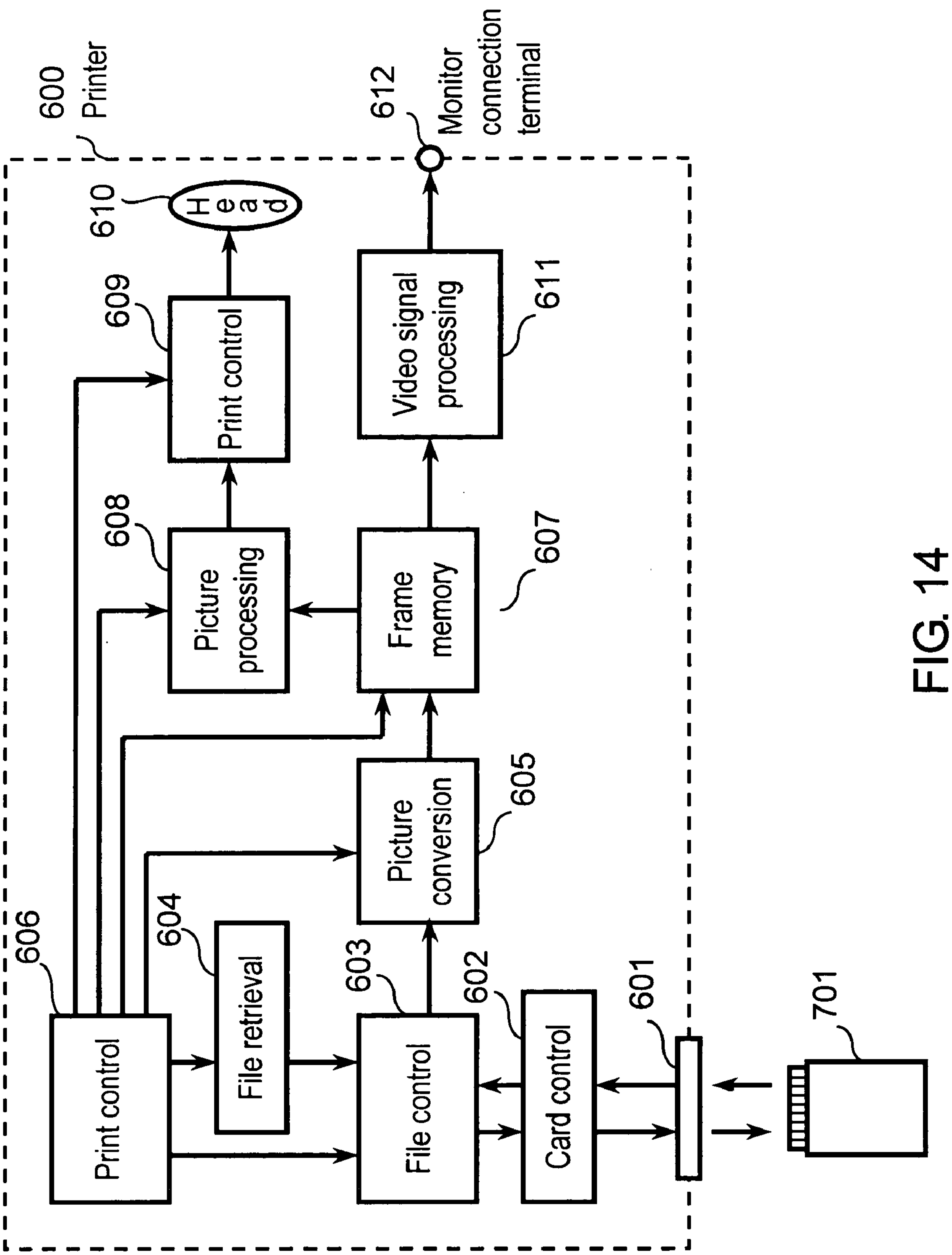
FIG. 14 is a block diagram showing a structure of a printer unit of a print system according to a sixth exemplary embodiment of the present invention.

A structure of the printer 600 is described with reference to a circuit structure diagram of FIG. 14. Its respective components are constituted of hardware, firmware or both.

The printer 600 has a connector 601 forming a slot on which the memory card 701 is to be mounted. A card control means 602 controls a controller (not shown) within the memory card 701 connected to the connector 601. A file control means 603 makes access to a file stored in the memory card 701 by using the card control means 602. A file retrieval means 604 retrieves all picture files having a predetermined format stored in the memory card 701 by using the file control means 603. A picture conversion means 605 expands a picture compressed upon recording. A print control means 606 controls an entire print operation of the entire printer 600. A picture data expanded by the picture conversion means 605 is written into a frame memory 607. The picture processing means 608 converts picture data to a data type which can be printed. A print control means 609 drives a thermal head 610 based on data processed by the picture processing means 608. A video signal processing means 611 receives a picture stored in the frame memory 607 and performs video signal transformation to convert to an analog signal. A monitor connection terminal 612 is a terminal for sending a picture signal from a video signal processing means 611 to a monitor.

Figure 15:
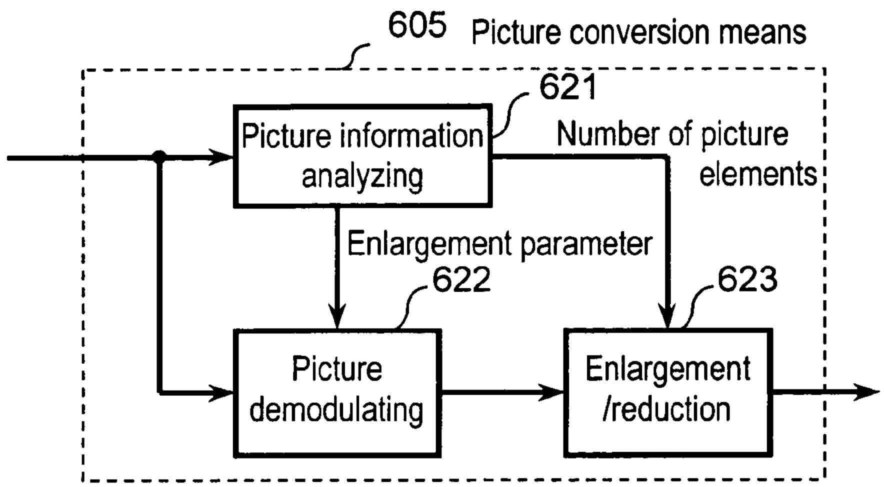
FIG. 15 is a block diagram showing a structure of a picture conversion means of a printer unit according to the sixth exemplary embodiment of the present invention.

FIG. 15 shows a circuit structure of the picture conversion means 605. A picture information analyzing means 621 analyzes a header portion of a file and extracts necessary information. A picture demodulating means 622 expands a compressed picture in the file using information analyzed by the picture information analyzing means 621. An enlargement/reduction means 623 enlarges or reduces an expanded picture to an appropriate size for storage in the frame memory 607 using picture element information of a picture extracted by the picture information analyzing means 621.

Next, an operation is described.

The card control means 602 is connected to a controller (not shown) contained in the memory card (PC card) 701 through the connector 601 for the PC card. Because the memory card 701 employs an interface protocol based on the IDE (ATA) hard disk standard for the personal computer, the card control means 602 controls each line according to driving and reading procedures based on the IDE interface.

Because the PC card employs a file format based on MS-DOS, the file control means 603 handles a track and sector in the unit of cluster (including multiple sectors) based on MS-DOS, controls each cluster by a table called file allocation table (FAT) and reads/writes an arbitrary file from a file structure having hierarchical directory using an arbitrary path name (directory name+file name).

Figure 16:
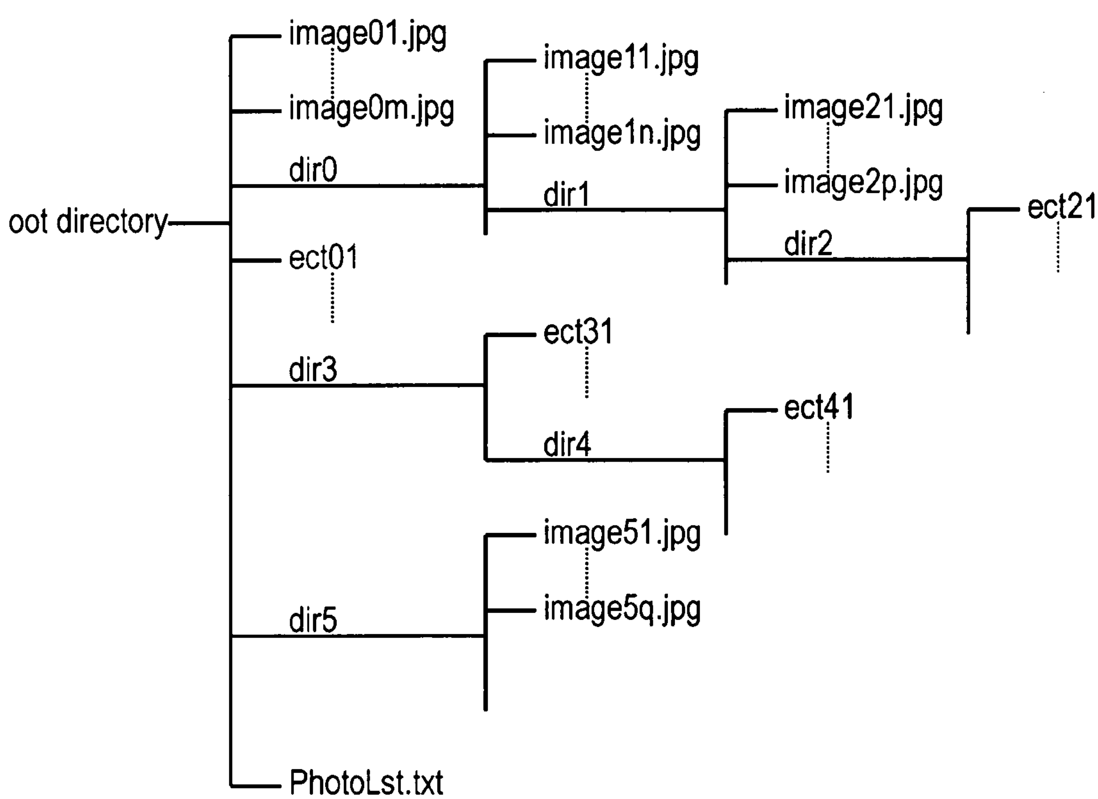
FIG. 16 is an explanatory view of a memory card directory structure of the print system according to the sixth exemplary embodiment.

FIG. 16 is an example of a file system having a hierarchical directory structure. A hierarchical directory structure can be produced freely by producing a sub-directory indicated by dirN in the same Figure in a root directory.

Because usually this directory is produced by DSC, if the DSC type is limited, the directory structure is fixed so that a directory name and a file name can be determined and read out. However, this embodiment provides an access method not depending on a location of a picture file and a file name, which is capable of flexibly coping with an incompatible directory structure produced arbitrarily by each DSC to secure a compatibility with a memory card produced by various DSCs, based on the fact that the PC card has a physical compatibility and its file system is standardized.

A method of making a user explicitly specify a directory name and a file name like the procedure for reading a PC card in a personal computer is also an example of this. To read a file, the user specifies a directory using a user interface of a personal computer, display file names in that directory and if there is a sub-directory, specify it, and finally specify a desired file name.

However, this method may not be the best method for the printer. For a printer aiming only to simply select a taken picture to cope with each DSC generally, it is desirable to be able to make an access to a file without being conscious of a file structure which is different among various DSCs and without the necessity of seeing a file name and directory name, that is, to be able to read the file regardless of its directory structure and where the picture file exits therein.

Figures 17, 18:
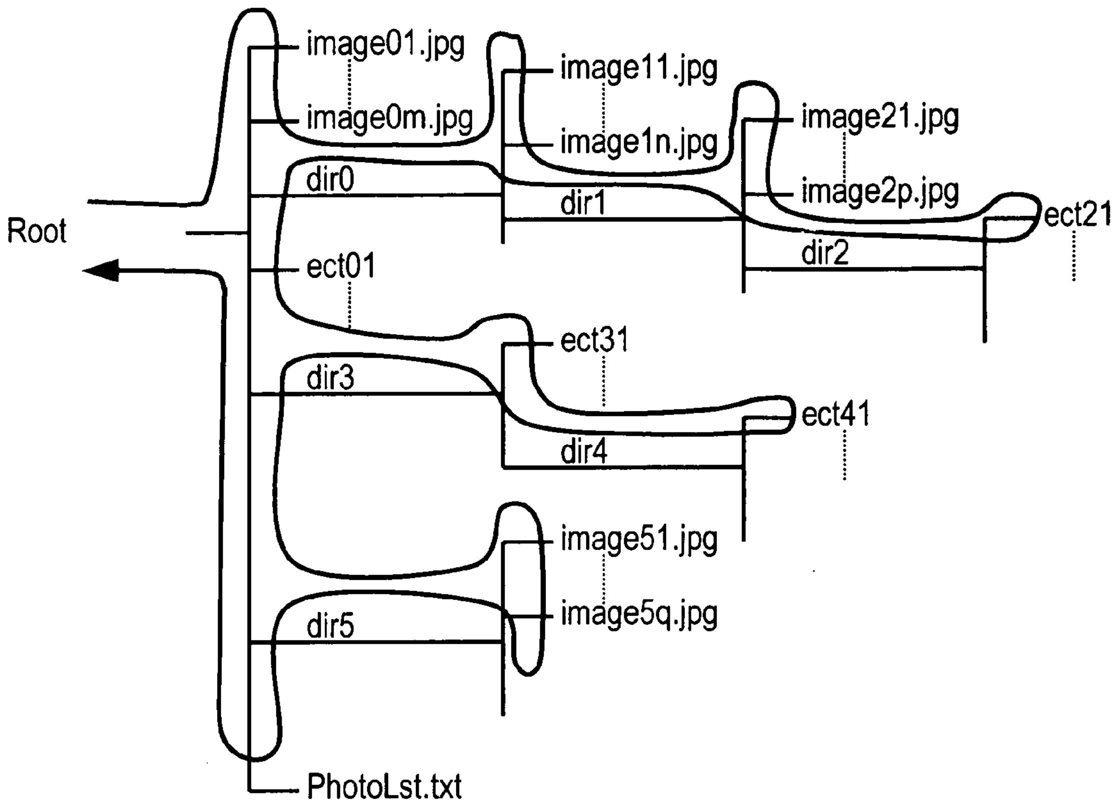
FIG. 17 is an explanatory diagram showing a procedure for retrieving a desired picture file by a file retrieval means of the printer unit according to the sixth exemplary embodiment from the directory structure shown in FIG. 16.
FIG. 18 is an explanatory diagram showing a content of print control file PhotoLst.txt of the printer unit according to a seventh exemplary embodiment of the present invention.

The file retrieval means 604 of this embodiment is an indispensable component for this purpose. FIG. 17 shows a procedure in which the file retrieval means 604 retrieves a desired picture file (having a file extension ".jpg") from the directory structure shown in FIG. 16.

The retrieval is started from root directory and first files from image01.jpg to image0m.jpg are found. Next, sub-directory dir0 is found and a retrieval object is changed to dir0. In dir0, files from image11.jpg to image1n.jpg are found. If the sub-directory dir1 is found out, the retrieval object is changed to that directory. This series operation is repeated. Further, after files from image21.jpg to image2p.jpg are found, each parent directory is retraced step by step. Likewise, dir3, dir4 and dir5 are passed and if files from image51.jpg to image5q.jpg are found, the retrieval operation is terminated.

This file retrieval procedure is generally called tree retrieval and can be achieved by a recursive algorithm. Because according to this embodiment, this tree retrieval is used and upon this series retrieval operation, files other than those having a file extension .jpg or an extension corresponding to a readable picture format are neglected, only desired picture files can be retrieved. Further, because an order of retrieved files is not changed if the tree retrieval procedure is not changed, the printer is capable of building a user interface equivalent to sequential arrangement of files.

Therefore, as for the printer browsing order, an order of picture files found in this retrieval becomes a specified order. If random access is made, it is recommendable to provide files with a sequence number in the order of finding.

A control method in which, first, all files are retrieved and the retrieved multiple file path names are memorized is simple and effective. However, in this embodiment, no path name is stored to reduce a memory size and as required, retrieval is carried out again from the root directory. For example, if it is desired to read out a fifth file, picture files are counted by retrieving the tree from the root directory and a path name of a file corresponding to the fifth position is obtained.

The file control means 603 reads a picture file found in this way by the card control means 602 and sends it to the picture conversion means 605 (this embodiment is described for the case where the picture file format is JPEG).

In the picture conversion means 605 shown in FIG. 15, the picture information analyzing means 621 analyzes the header portion of a received file and extracts expansion parameters (XY picture element number, quantizing table, Huffman table, etc.) necessary for JPEG demodulation and other information necessary for the printer. The picture demodulation means 622 demodulates JPEG data stored in the file using a parameter extracted by the picture information analyzing means 621. If the XY picture element number of an original picture extracted by the picture information analyzing means 621 does not coincide with a picture element number of the frame memory 607, the enlargement/reduction means 623 enlarges or reduces that number to a picture element number which can be stored optimally.

If an aspect ratio of the picture element of the JPEG picture does not coincide with the aspect ratio of the picture element of the frame memory, an enlargement rate or reduction rate in the X direction or Y direction is changed.

For example, a print range of this printer is 640 pixels×480 pixels and the aspect ratio is 4:3. If a number of picture elements equivalent to BASE of Photo CD (768 pixels×512 pixels, aspect ratio=3:2) is input, a larger one of 768/640=1.2 or 512/480=1.067 is adopted as a reduction rate. In this case, that picture is reduced to 640 pixels×426 pixels so that it can be accommodated within a print range in a condition so that an edge of the picture is not cut. Further, by adopting a smaller reduction rate and dividing the horizontal direction to 640 pixels, it is also possible to obtain 640 pixels× 480 pixels.

By an operation described above, a picture selected by the user interface is read into the frame memory 607.

Here, the print control means 606 controls entirely the printer 600 corresponding to the above described user interface. For example, each time when a picture retrieved by the file retrieval means 604 is displayed, the user is asked whether or not he wants to print. If the user selects printing, the printing is carried out by an operation described later and a next picture is displayed. If the user selects to skip, that picture is not printed but a next picture is displayed.

Next, an operation of a case in which the print control means 606 instructs printing is described. According to an instruction of the print control means 606, the frame memory 607 sends picture data to the picture processing means 608. The picture processing means 608 produces thermal head driving pulse width data to be transferred to the print control means 609 according to picture data (in this embodiment, Y, Cb, Cr types specified by CCIR601 standard for JPEG) stored in the frame memory. A content of the processing of the picture processing means 608 is as follows.

*Conversion from Y, Cb, Cr to R, G, B $$R=y+1.4\ Cr \tag{1a}$$

$$G=Y-0.344\ Cb-0.714\ Cr \tag{1b}$$

$$B=Y+1.77\ Cb \tag{1c}$$

*Reverse gamma conversion from R, G, B to linear r, g, b excluding picture gamma (usually 0.45)

$$r=R^{**}2.2 \tag{2a}$$

$$g=G^{**}2.2 \tag{2b}$$

$$b=B^{**}2.2 \tag{2c}$$

*Conversion from r, g, b to three-primary colors Dr, Dg, Db $$Dr=\log(1/R) \tag{3a}$$

$$Dg=\log(1/G) \tag{3b}$$

$$Db=\log(1/B) \tag{3c}$$

*Conversion from Dr, Dg, Db to ink density signals C, M, Y by masking processing (3×3 matrix operation) for color correction $$(C,\ M,\ Y)t=[A](Dr,\ Dg,\ Db)t \tag{4}$$

([A] indicates 3×3 masking matrix, t indicates transpose)

*Conversion from ink density signal to driving pulse width data Pwc, Pwm, Pwy necessary for obtaining the density $$Pwc=f(C) \tag{5a}$$

$$Pwm=f(M) \tag{5b}$$

$$Pwy=f(Y) \tag{5c}$$

(f indicates lookup table)

According to driving pulse width data Pwc, Pwm, Pwy obtained by the above picture processing, the print control means 609 produces a driving signal for pulse width modulation on the thermal head 610 and transfers a desired ink from a sublimation type ink film to a picture receiving paper through the thermal head 610 to print a full color picture selected by the user.

Seventh Exemplary Embodiment

Next, a seventh embodiment of the present invention is described. An internal structure of the printer 600 shown in FIG. 14 is the same and the print control means 606 performing a different operation is described.

The print control means 606 has the following two print modes.

Figure 19:
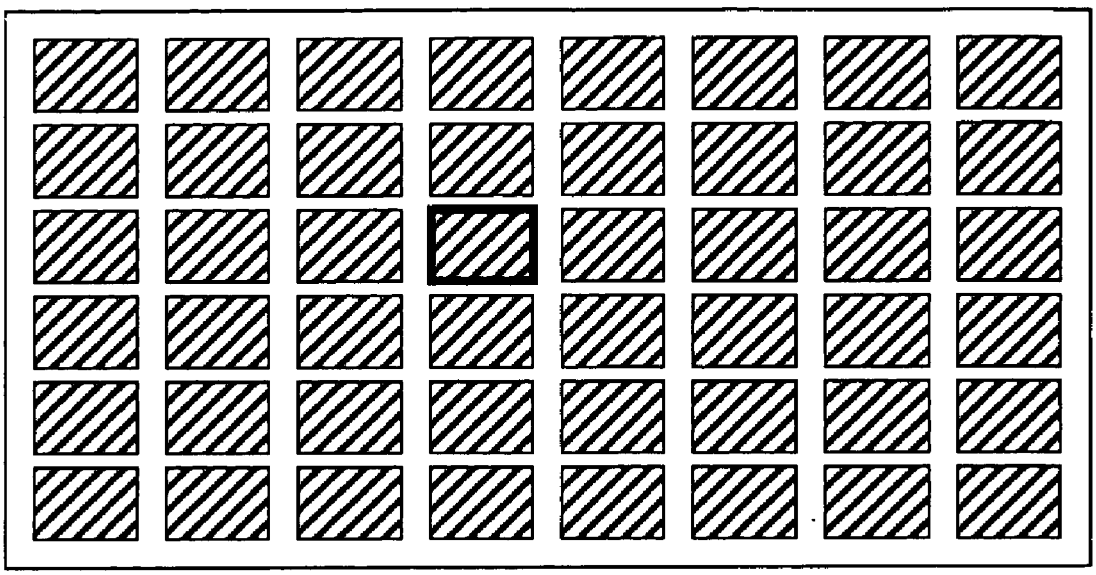
FIG. 19 is an explanatory diagram of monitor display of thumbnail pictures in the printer unit according to the seventh exemplary embodiment of the present invention.

In the first mode the printer 600 retrieves multiple files on the directory tree of FIG. 16 successively using the file retrieval means 604 and reads a picture from each file using the file control means 603 and picture conversion means 605. In this embodiment, the picture conversion means 605 reduces pictures to thumbnail pictures each of which is a smaller size according to an instruction of the print control means 606 and then multiple thumbnail pictures as shown in FIG. 19 are displayed on a monitor 702 from the frame memory 607.

The user specifies multiple pictures which he wants to print by moving a selection cursor as shown by a bold line frame on a thumbnail picture on the screen by means of a cursor key and the print control means 606 memorizes its number, path name or picture number.

The print control means 606 reads out specified multiple pictures one by one using the file control means 603, expands each picture to a full size of the frame memory 607 by the picture conversion means 605 and prints it using the picture processing means 608 and print control means 609. By repeating this series processing for the selected multiple files, all pictures selected by the user are continuously printed by seeing each thumbnail picture.

In the selection of multiple files, a quantity of copies for each selected picture can be set and therefore the same processing as reprint work at photo lab can be automatically carried out.

In the second mode, if the print control means 606 confirms that a print control file (in this embodiment, PhotoLst.txt existing in the root directory of FIG. 16) exists at a particular position of the PC card, all procedures from selection of a file to printing is automatically carried out according to control information described in this file.

FIG. 18 shows an example of the content of PhotLst.txt. PhotoLst.txt is a text file and an identifier for indicating a print control file is described on the first line. Subsequently, a full path name of a file name of a picture to be printed and a number of prints are described on each line. If the number of prints is 1, the number of prints may be omitted.

This example indicates that two pieces of image12.jpg, a piece of image2g.jpg and three pieces of image53.jpg will be printed in this order.

If the print control means 606 confirms an existence of this file, it opens PhotoLst.txt by means of the file control means 603 and memorizes a content of description of each line. According to the content of this description, multiple prints based on the content of PhotoLst.txt is carried out by the same operation as selection of multiple pictures by the thumbnail picture.

Registration to PhotoLst.txt of a picture and the number of prints to be printed is carried out through the DSC 700. If a picture taken with the DSC 700 is printed, first of all, the recorded picture is displayed on a liquid crystal display mounted on the DSC 700 and a picture to be printed is selected and that picture is registered through a user interface of the DSC 700. If the registration is executed first, the DSC 700 produces a file named PhotoLst.txt and writes information of a line therein, and each time when another picture is registered, another line is added so as to produce PhotoLst.txt.

A feature of the second mode of this embodiment exists in that browsing of a picture using the monitor 702 of the printer 600 is not necessary so that only by inserting a card, all processing is automatically carried out in batch processing. Therefore, the printer 600 is capable of printing a specified picture in a condition that the monitor 702 cannot be connected (e.g. when the printer 600 is taken outdoors).

By having the aforementioned two modes, this embodiment provides ease of use in which a picture to be printed can be determined by seeing multiple thumbnail pictures displayed on a large screen in home use, and convenience in that even in an environment in which the monitor cannot be used because it is taken outdoor, a picture to be printed can be specified by using a liquid crystal display of the DSC. Further because multiple pictures can be specified in batch even if either mode is used, the user does not have to operate the printer during printing so that the picture can be automatically printed. Therefore, a picture determined on the DSC can be automatically printed in a desired quantity without any additional treatment.

Eighth Exemplary Embodiment

Next, an eighth embodiment of the present invention is described.

A printer unit of this embodiment contains a digital interface based on the memory card 701 and an analog interface possessed by a conventional video printer.

Figure 20:
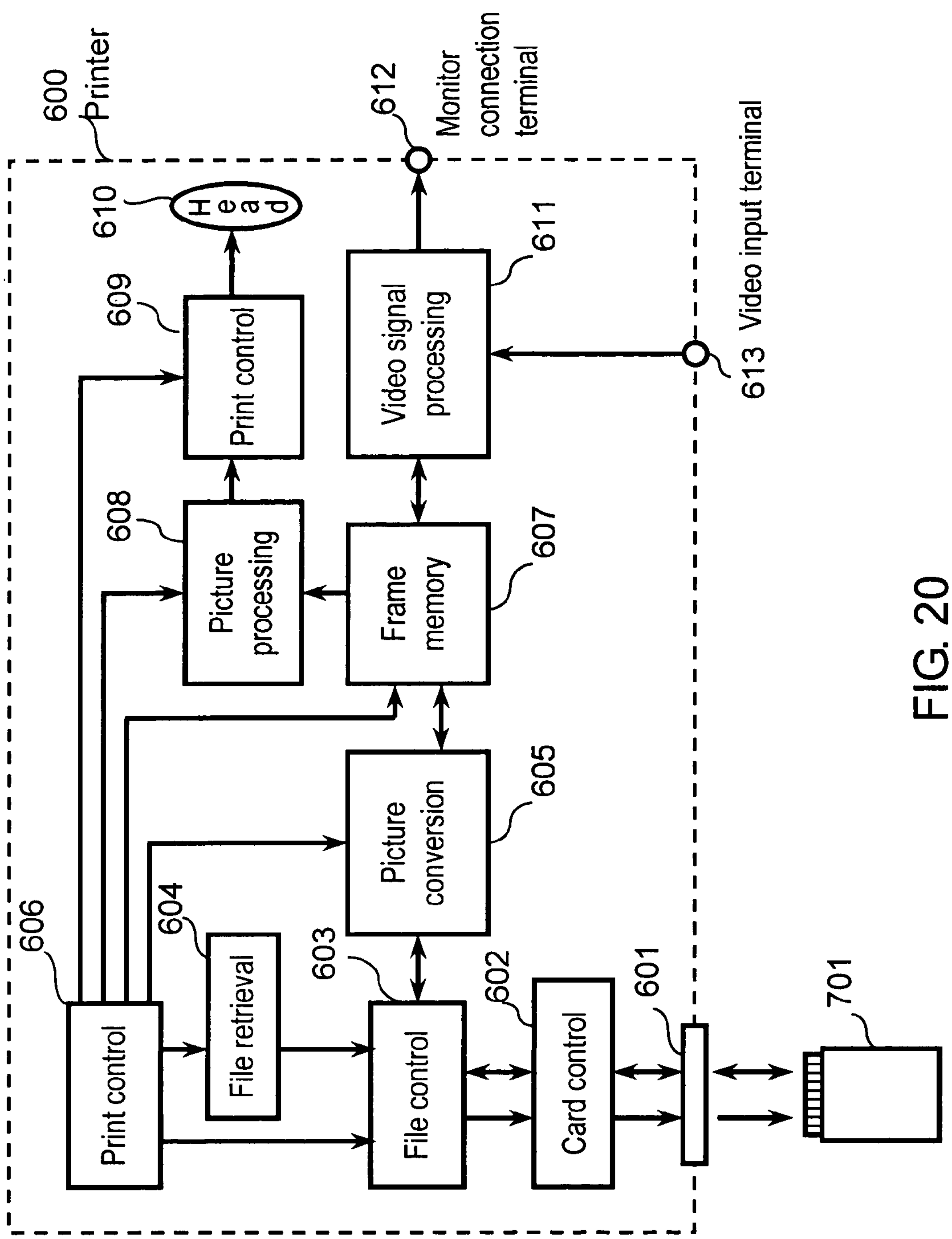
FIG. 20 is a block diagram showing a structure of a printer unit according to an eighth exemplary embodiment of the present invention.
Figure 21:
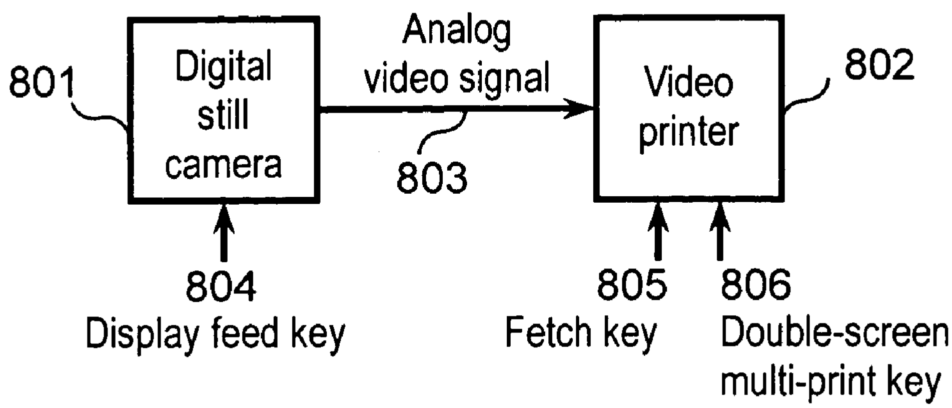
FIG. 21 is a block diagram showing a structure of a conventional print system utilizing a digital camera.
Figure 22:
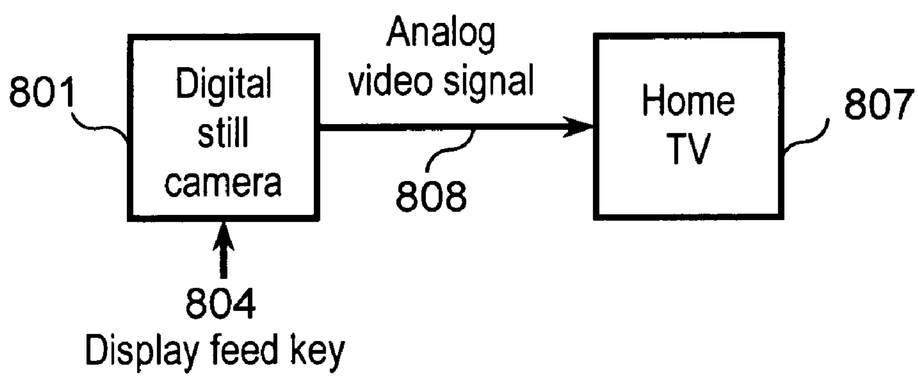
FIG. 22 is a block diagram showing a structure of a conventional display system utilizing a digital camera.
Figure 23:
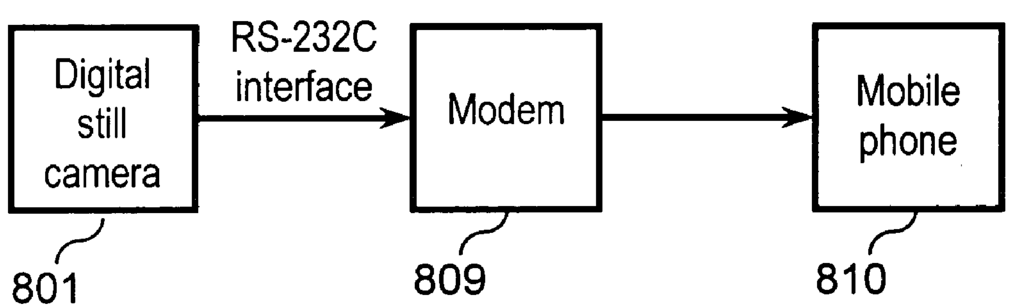
FIG. 23 is a block diagram showing a structure of a conventional transmission system utilizing a digital camera.

FIG. 20 shows a structure of the printer 600 of the present embodiment. The structure and operation of this embodiment are the same as FIG. 14 except the following. A printer unit 600 further comprises a video input terminal 613. A video signal processing means 711 has both operations for receiving a picture stored in the frame memory 607 and performing video signal transformation to convert to an analog signal, and for receiving an input signal from the video input terminal 613 and converting the video signal to a form which can be stored in the frame memory 607. A picture signal from the frame memory 607 is written into the memory card 701 through the picture conversion means 705, file control means 603, card control means 602 and connector 601.

The frame memory 607 in printer 600 of FIG. 20 carries out two operations.

As for a first function, the frame memory 607 functions as a buffer memory for printing a picture read out from the memory card 701 thumbnail and functions for helping the user to select a picture to be printed properly as a user interface element by previewing a full-size picture or a thumbnail picture. This function is realized using a picture output function of the video signal processing means 711.

A second function is a function which is realized using a picture input function of the video signal processing means 711. Concretely, this is a function for capturing a video signal of NTSC or the like connected to the video input terminal 613. Because this function is a basic function originally provided on a conventional analog video printer, a detailed description is omitted.

An analog video signal input from the video input terminal 613 undergoes Y/C separation and decoding to RGB or Y, Cb, Cr by the video signal processing means 711 and further A/D conversion and then the converted signal is stored in the frame memory 607. The stored picture can be printed in the same operation as described in the sixth embodiment.

Additionally, in the printer unit of this embodiment, a picture captured by the frame memory 607 is converted to a predetermined file format by the picture conversion means 705 and the file control means 603 stores the file in the memory card 701. Because the picture memorized in the memory card 701 can be read into the frame memory 607 again in the same procedure as for a picture memorized by the DSC 700, a function for storing the captured analog video signal is realized.

Another function of this embodiment is to provide an environment in which the analog video camera can be used as freely as the DSC 700. That is, because in a conventional video printer, a captured picture is lost when a next picture is captured, picture feed for reprint cannot be done although simultaneous print is enabled. This embodiment is capable of solving such an inconvenience.

Further, because capturing of pictures and storage thereof into the memory card can be carried out and printing of multiple pictures in batch by the function described in the sixth embodiment or seventh embodiment is enabled, the necessity for a user to witness printing of each picture can be eliminated.

As described above, according to this embodiment, only by adding a slight function to the video card input type printer, not only the conventional video printer function can be achieved but also all the functions for achieving a print from the DSC using the memory card 701 are available also for analog video input.

Therefore, the printer of this embodiment not only can meet requirements of the DSC of each manufacturer corresponding to the memory card but also can print from an analog video movie (including digital video movie) or DSC having no memory card.

Although in the above respective embodiments, it has been described that the extension retrieves .jpg, the extension type is not restricted but it is permissible to determine a file format according to header information after each file is opened.

Although the above respective embodiments have been described by taking a case in which the memory card is the PC card and the picture file is JPEG as an example, because the requirement of the memory card is only that it is removable and nonvolatile for memorizing a file, the memory card of this invention can be replaced with a floppy disk, hard disk card, MO, optical disk based on phase change, magnetic tape, memory card backed up by power supply and the like. As for the file format, because most picture files have header information and picture information, they can be used under the structure of this embodiment.

Further, the file format to be written into the memory card 701 according to the eighth embodiment does not have to meet the JPEG which is used by the DSC as standard but may be of more simple format.

Although the thumbnail picture is realized by using the reduction function of the picture conversion means 605, 705, it is a reasonable way to demodulate the JPEG by only DC components upon enlargement of a compressed picture by the picture conversion means 605, 705, so as to directly obtain a ⅛ reduced picture.

As described above, in a system of the present invention in which the printer unit, video display unit, video transmission unit and video viewing unit are combined with a digital camera, the digital camera can be freely used even during print, display or transmission of a taken picture.

Further in the printer unit or print system according to the present invention, when multi-screen printing is carried out, a vertical direction of each picture is unified.

In the printer unit or print system of the present invention, upon reprint operation, the sorting work after the print can be carried out easily.

Further, by combining this system with the DSC, the printer unit of the present invention becomes a friendly home print system corresponding to the role of conventional camera shop and photo lab. This invention is capable of ensuring a digital higher quality interface as compared to the other similar systems using the video printer. As compared to the conventional printers directly connected to the DSC through other digital interface, the problem that it takes a long time to transmit a picture has been solved. Further, an effect not seen in the conventional systems has been achieved in that after pictures to be printed are instructed in batch by browsing them on the printer for confirmation, they can be printed without any help of the user.

Because the file format of the DSC of each manufacturer is generally converging to JPEG, it is unlikely that there will ever occur a case in which it functions only under a combination with a particular DSC unlike other digital interfaces, so that a high versatility is ensured.

When a picture is printed from a memory card recorded with the DSC of each manufacturer, the user can determine a picture to be printed successively while seeing it without being conscious of the directory structure and file name of each manufacturer.

Further, by displaying browsed pictures one by one, a picture which a user likes can be printed easily. Multiple pictures taken with the DSC can be displayed in thumbnail fashion and by specifying some pictures of them and a number of copies, multiple pictures can be printed according to that specification. By monitoring pictures by the DSC which took the pictures and specifying a picture to be printed, the specified picture can be automatically printed in a condition in which no monitor is connected to the printer.

Further, in case of print from the analog video signal, the same function as for pictures from the DSC, such as picture feed for print and batch print can be achieved, so that a wider versatility for input device can be ensured.

What is claimed is:

1. A digital camera comprising:

a memory receptor operable to receive a memory which is separable from said digital camera;

a picture capturing unit operable to capture picture information corresponding to an image and store the picture information in the memory while the memory is attached to said digital camera via said memory receptor;

a display unit operable to display an image of the picture information stored in the memory;

a key adapted to be manipulated by a user of said digital camera and operable to rotate an angle of the image displayed on said display unit in response to user manipulation; and a control information processor operable to obtain the angle of rotation and, according to the obtained angle of rotation, signal to the memory how the image of the picture information stored in the memory and displayed on said display unit is to be rotated.

2. The digital camera according to claim 1, wherein said display unit is operable to display the rotated image of the picture information after said control information processor signals to the memory how the image of the picture information stored in the memory and displayed on said display unit is to be rotated.

3. The digital camera according to claim 1, wherein said control information processor is operable to signal to the memory how the image of the picture information stored in the memory and displayed on said display unit is to be rotated during imaging thereof, the imaging being processed after the memory is separated from said digital camera.

4. A digital camera according to claim 1, wherein said display unit is integrated into said digital camera.

5. A digital camera according to claim 1, wherein said display unit is disposed in a landscape orientation during the display of the image of the picture information and during the display of the rotated image of the picture information.

6. A digital camera comprising:

a memory receptor operable to receive a memory which is separable from said digital camera;

a picture capturing unit operable to capture picture information corresponding to an image and store the picture information in the memory while the memory is attached to said digital camera via said memory receptor;

a display unit operable to display an image of the picture information stored in the memory;

a key adapted to be manipulated by a user of said digital camera and operable to rotate an angle of the image displayed on said display unit in response to the user manipulation; and a control information processor operable to obtain the angle of rotation and, according to the obtained angle of rotation, store processing control information in the memory, the processing control information being indicative of how the image of the picture information stored in the memory and displayed on said display unit is to be rotated.

7. A digital camera according to claim 6, wherein said display unit is operable to display the rotated image of the picture information after said control information processor stores the processing control information in the memory.

8. A digital camera according to claim 6, wherein said display unit is integrated into said digital camera.

9. A digital camera according to claim 6, wherein said display unit is disposed in a landscape orientation during the display of the image of the picture information and during the display of the rotated image of the picture information.

10. A digital camera comprising:

a memory receptor operable to receive a memory which is separable from said digital camera;

a picture capturing unit operable to capture picture information corresponding to an image;

a rotation device operable to rotate a display angle of the picture information;

a display unit operable to display a rotated image of the picture information according to the rotated display angle;

a control information processor operable to obtain the rotated display angle and, according to the rotated display angle, store in the memory how an image of the picture information is to be rotated.

11. A digital camera according to claim 10, wherein said display unit is operable to display the rotated image of the picture information after said control information processor stores in the memory how the image of the picture information is to be rotated.

12. A digital camera according to claim 10, wherein said control information processor is operable to store in the memory how the image of the picture information is to be rotated during imaging thereof, the imaging being processed after the memory is separated from said digital camera.

13. A digital camera according to claim 10, wherein said display unit is integrated into said digital camera.

14. A digital camera according to claim 10, wherein said display unit is disposed in a landscape orientation during a display of the image of the picture information and during the display of the rotated image of the picture information.

15. A digital camera according to claim 10, wherein said rotation device is a key which enables a user to rotate the display angle of the picture information.

16. A digital camera according to claim 15, wherein a rotation angle of the picture information displayed on said display unit is changed by 90 degrees upon manipulation of said key by a user of said digital camera.

17. A digital camera according to claim 10, wherein said picture capturing unit is operable to store the captured picture information in the memory while the memory is attached to said digital camera via said memory receptor.

18. A digital camera according to claim 10, wherein the memory is a memory card.

19. A digital camera according to claim 10, wherein the rotated display angle is automatically set according to a posture of said digital camera.

20. A digital camera according to claim 10, wherein said rotation device is a posture detection device operable to automatically obtain a posture of said digital camera and automatically set the rotated display angle according to the posture of said digital camera.

21. A digital camera according to claim 10, wherein a size of an image displayed on said display unit is automatically adapted to a size of said display unit when changing a rotation angle of the image.

* * * * *